(12) United States Patent
Zhou et al.

(10) Patent No.: US 10,723,897 B2
(45) Date of Patent: Jul. 28, 2020

(54) INKJET COMPOSITIONS

(71) Applicant: Hewlett-Packard Development Company, L.P., Spring, TX (US)

(72) Inventors: Zhang-Lin Zhou, San Diego, CA (US); Rodney David Stramel, San Diego, CA (US); Gregg A. Lane, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,270

(22) PCT Filed: Jan. 31, 2017

(86) PCT No.: PCT/US2017/015913
§ 371 (c)(1),
(2) Date: Mar. 7, 2019

(87) PCT Pub. No.: WO2018/143966
PCT Pub. Date: Aug. 9, 2018

(65) Prior Publication Data
US 2019/0352519 A1    Nov. 21, 2019

(51) Int. Cl.
*B41J 11/00*     (2006.01)
*C09D 11/101*     (2014.01)
(Continued)

(52) U.S. Cl.
CPC .......... *C09D 11/101* (2013.01); *B41J 11/002* (2013.01); *B41M 5/0023* (2013.01); *C09D 11/322* (2013.01)

(58) Field of Classification Search
None
See application file for complete search history.

(56) References Cited

U.S. PATENT DOCUMENTS 6,294,592 B1    9/2001    Herrmann et al.
6,352,805 B1    3/2002    Taylor et al.
(Continued)

FOREIGN PATENT DOCUMENTS

EP    0038830    10/1989
EP    1792956    6/2007
(Continued)

OTHER PUBLICATIONS

International Search Report dated Oct. 5, 2017 for PCT/US2017/015913, Applicant Hewlett-Packard Development Company, L.P.

*Primary Examiner* — Erica S Lin
(74) *Attorney, Agent, or Firm* — HP Inc. Patent Department

(57) ABSTRACT

The present disclosure relates to an inkjet composition comprising a curable polyurethane dispersion and an aqueous carrier. The curable polyurethane dispersion comprises at least one of a) a polyurethane polymer comprising a first terminal group selected from a styrene-containing group, an allyl-containing group and an acrylamide-containing group, and a polyurethane polymer comprising a second terminal group comprising an ionic group; and/or a polyurethane polymer comprising a first terminal group at one end and a second terminal group at the opposite end, wherein the first terminal group is selected from a styrene-containing group, an allyl-containing group and an acrylamide-containing group, and the second terminal group comprises an ionic group; b) a polyurethane polymer comprising a terminal group selected from at least one of stabilising groups (A) and (B); and c) a polyurethane polymer comprising a polyurethane chain formed by the polymerisation of (i) a blend of at least two different diisocyanates and (ii) a reactive diol.

16 Claims, 1 Drawing Sheet

(51) Int. Cl.
*B41M 5/00* (2006.01)
*C09D 11/322* (2014.01)

(56) References Cited

U.S. PATENT DOCUMENTS

| | | |
|---|---|---|
| 7,578,587 B2 | 8/2009 | Belelie et al. |
| 8,087,768 B2 | 1/2012 | Daems et al. |
| 8,128,744 B2 | 3/2012 | Luer et al. |
| 8,235,517 B2 | 8/2012 | Grant et al. |
| 8,697,768 B2 | 4/2014 | Seung |
| 8,783,842 B2 | 7/2014 | Ingle et al. |
| 8,857,977 B2 | 10/2014 | Grant et al. |
| 8,931,889 B2 | 1/2015 | Roberts et al. |
| 9,458,339 B2 | 10/2016 | De Rossi et al. |
| 9,523,012 B2 | 12/2016 | Brandstein et al. |
| 9,605,180 B2 | 3/2017 | Illsley et al. |
| 2002/0064397 A1 * | 5/2002 | Kellie .................. G03G 15/101 399/237 |
| 2006/0088674 A1 | 4/2006 | Hladik et al. |
| 2011/0008542 A1 | 1/2011 | Zeng et al. |
| 2011/0143040 A1 | 6/2011 | Yamasaki et al. |
| 2014/0285568 A1 | 9/2014 | Loccufier et al. |
| 2015/0030823 A1 | 1/2015 | Stamatoukos et al. |
| 2016/0053124 A1 * | 2/2016 | Brandstein ........... C09D 11/101 347/102 |
| 2016/0271970 A1 | 9/2016 | Illsley et al. |
| 2016/0347960 A1 | 12/2016 | Morita et al. |
| 2017/0028688 A1 | 2/2017 | Dannhauser et al. |
| 2017/0101547 A1 | 4/2017 | Loccufier et al. |

FOREIGN PATENT DOCUMENTS

| | | |
|---|---|---|
| EP | 2657308 | 12/2013 |
| GB | 2512430 | 10/2014 |
| JP | H07140901 | 6/1995 |
| JP | 2005255833 A * | 9/2005 |
| RU | 2456306 | 7/2012 |
| WO | 9838241 | 9/1998 |
| WO | 2006111707 | 10/2006 |
| WO | WO-2014162290 A1 * | 10/2014 ........... C09D 11/326 |
| WO | 2015152862 | 10/2015 |
| WO | 2016122569 | 8/2016 |
| WO | 2016143889 | 9/2016 |
| WO | 2016164220 | 10/2016 |

* cited by examiner

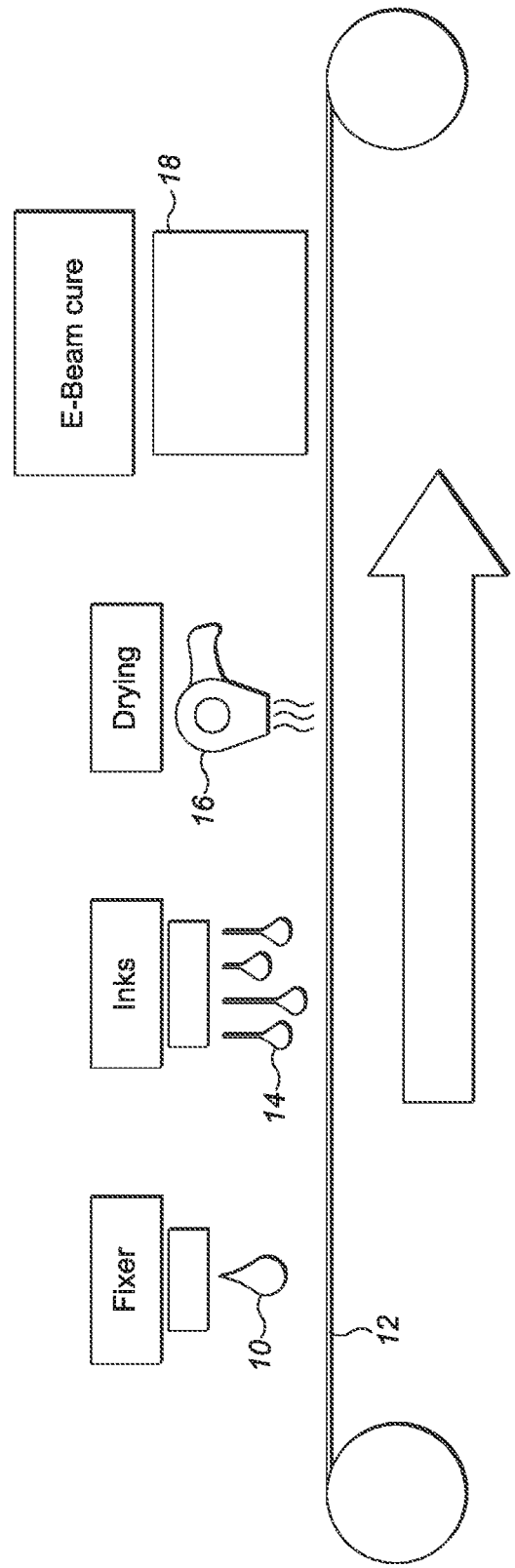

INKJET COMPOSITIONS

BACKGROUND

Inkjet printing is a printing method that utilizes electronic signals to control and direct droplets or a stream of ink onto print media. Inkjet printing may involve forcing ink drops through small nozzles by thermal ejection, piezoelectric pressure or oscillation onto the surface of the media. This technology can be used to record images on various media surfaces (e.g. paper).

In inkjet printing, curable polymer binders may be added to inkjet inks to improve the durability of the resulting print. Such binders may be cured, for example, by exposure to radiation e.g. UV radiation.

BRIEF DESCRIPTION OF THE DRAWINGS

Various implementations are described, by way of example, with reference to the accompanying drawings, in which:

FIG. 1 is a schematic diagram illustrating, by way of example, an example of a printing process of the present disclosure.

DETAILED DESCRIPTION

Before the present disclosure is disclosed and described, it is to be understood that this disclosure is not limited to the particular process steps and materials disclosed in this disclosure because such process steps and materials may vary. It is also to be understood that the terminology used in this disclosure is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used in this disclosure, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the inkjet composition.

As used in this disclosure, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

The present disclosure relates to an inkjet composition comprising a curable polyurethane dispersion and an aqueous carrier. The curable polyurethane dispersion comprises at least one of:

a) a polyurethane polymer comprising a first terminal group selected from a styrene-containing group, an allyl-containing group and an acrylamide-containing group, and a polyurethane polymer comprising a second terminal group comprising an ionic group; and/or a polyurethane polymer comprising a first terminal group at one end and a second terminal group at the opposite end, wherein the first terminal group is selected from a styrene-containing group, an allyl-containing group and an acrylamide-containing group, and the second terminal group comprises an ionic group;

b) a polyurethane polymer comprising a terminal group selected from at least one of the stabilising groups (A) and (B):

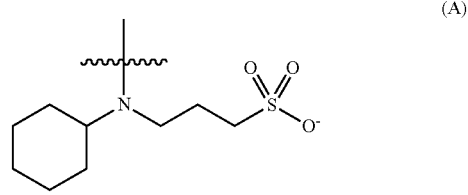

(A)

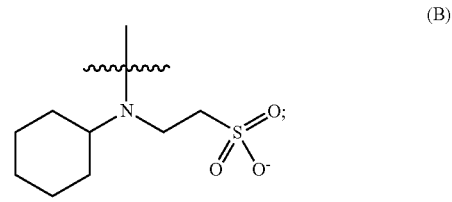

(B)

and c) a polyurethane polymer comprising a polyurethane formed by the polymerisation of (i) a blend of at least two different diisocyanates and (ii) a reactive diol having the formula:

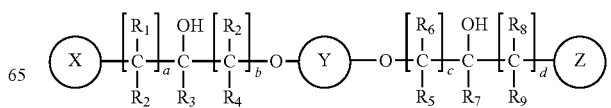

where:
$R_1$ to $R_9$ are each independently selected from H and alkyl;
a, b, c and d are integers selected from the range 1 to 6;
X and Z are independently selected from methacrylate or acrylate groups of the formulae:

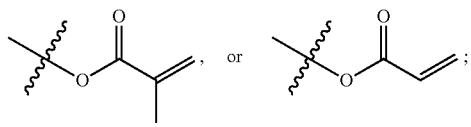

and

Y is an aliphatic moiety.

The present disclosure also relates to an inkjet printing method. The method comprises inkjet printing an inkjet composition as described herein onto a print substrate, and curing the printed inkjet composition on the substrate using electron beam radiation.

Polyurethane dispersions may be used as curable polymer binders in curable aqueous inkjet ink compositions. However, some polyurethane dispersions comprise polyurethanes that can be susceptible to hydrolysis. Hydrolysis can alter the pH of the inkjet composition, causing colorants dispersants in the inkjet composition to precipitate or "crash out" from the inkjet composition. This can have a negative effect on the lifespan of the inkjet composition, making such inkjet compositions less suitable for long-term storage. Precipitation can also have a negative impact on the jettability of the inkjet composition. The polyurethanes employed in the present disclosure can be designed to be less susceptible to hydrolysis. Accordingly, they may be pH stable, for example, under mildly alkaline conditions. This can help to maintain the colorants in dispersion within the inkjet composition. Furthermore, the polyurethanes employed in the present disclosure can be conveniently cured, for example, by electron beam radiation. In some examples, this can allow inkjet compositions to be formulated with reduced amounts or no photoinitiator. This can be helpful, for example, when printing on substrates intended for food, beverage or pharmaceutical packaging, as the risk associated with any unreacted photoinitiators remaining in the printed composition after curing may be reduced.

Curable Polyurethane Dispersion (cPUD)

The curable polyurethane dispersion may comprise a polyurethane polymer falling within a), b) and/or c) above. Polyurethane polymers (a), (b) and (c) will be described, by way of example, in further detail below. It should be noted, however, that the definitions of (a), (b) and (c) are not mutually exclusive and it is possible for a polymer to meet the requirements of two or even three of polyurethanes (a), (b) and (c) above.

In some examples, the polyurethane dispersion in the inkjet composition may be pH stable. In some examples, the polyurethane in the inkjet composition may be resistant to hydrolysis, for instance, at pH of 5 to 8. In some examples, the polyurethane may be suitable for use in inkjet ink compositions having a pH of 5 to 8, for instance, 6 to 8. In some examples, the pH of the polyurethane dispersion may remain stable after a period of storage. For instance, the pH of the polyurethane dispersion may vary by less than 1 pH unit when subjected to an accelerated shelf life (ASL) test in which the dispersion is maintained at a temperature of 60 degrees C. for 1 or 2 weeks. In some examples, the pH of the polyurethane dispersion may vary by less than 0.5 pH unit when subjected to an accelerated shelf life (ASL) test in which the dispersion is maintained at a temperature of 60 degrees C. for 1 or 2 weeks.

The curable polyurethane dispersion may be curable by, for example, electron beam curing. This may allow the dispersion to be cured in the absence of a photoinitiator or with reduced amounts of photoinitiator.

In some examples, the polyurethane dispersion may comprise a polyurethane that comprises at least one reactive side group selected from a methacrylate-containing group, an acrylate-containing group, an acrylamide-containing, an allyl-containing and a styrene-containing group. Suitable methacrylate-containing, acrylate-containing, acrylamide-containing, allyl-containing and a styrene-containing side groups can be introduced into the polyurethane backbone by selecting suitable reactive diols for polymerisation with diisocyanates as described below.

The polyurethane may have an acid number of 20 to 100. The pH stable curable polyurethane may have a double bond density from 1.5 to 1.0 meq/g.

The particle size range of the polyurethane dispersion may be 10 to 200 nm, for example, 12 to 150 nm.

Polyurethane Polymer (a)

The curable polyurethane dispersion may comprise a) a polyurethane polymer comprising a first terminal group selected from a styrene-containing group, an allyl-containing group and an acrylamide-containing group, and a polyurethane polymer comprising a second terminal group comprising an ionic group; and/or a polyurethane polymer comprising a first terminal group at one end and a second terminal group at the opposite end, wherein the first terminal group is selected from a styrene-containing group, an allyl-containing group and an acrylamide-containing group, and the second terminal group comprises an ionic group.

In some examples, the polyurethane polymer comprises a first terminal group at one end and a second terminal group at the opposite end, wherein the first terminal group is selected from a styrene-containing group, an allyl-containing group and an acrylamide-containing group, and the second terminal group comprises an ionic group.

Where the terminal or capping group is an acrylamide, the acrylamide-containing capping group may be $CH_2$=$CHC(O)NH(CH_2)_nO$—, wherein n is an integer from 1 to 10. In some examples, n is 1 to 6, for instance, 1 to 4 or 2 to 3. In one example, the acrylamide-containing capping group may be:

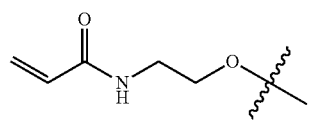

(I)

The acrylamide-containing group may be formed by reacting a polyurethane pre-polymer with an acrylamide-containing monoalcohol or monoamine. For example, a acrylamide-containing monoalcohol may react with terminal —N=C=O groups on the polyurethane pre-polymer. An example of a suitable acrylamide-containing mono-alcohol may be:

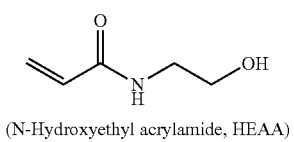

(N-Hydroxyethyl acrylamide, HEAA)

Where the capping group comprises a styrene-containing group, suitable styrene-containing capping groups may include:

(II)

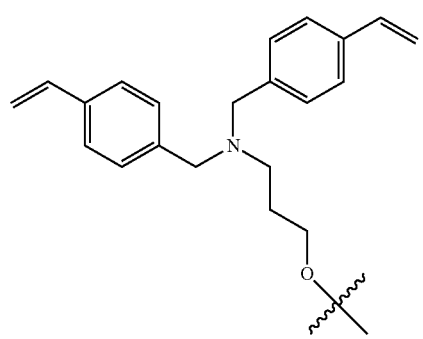

(III)

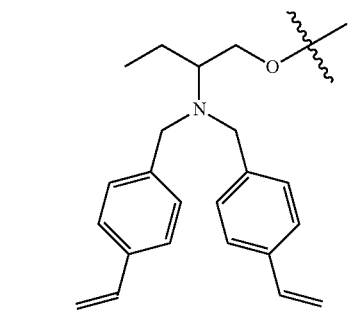

(IV)

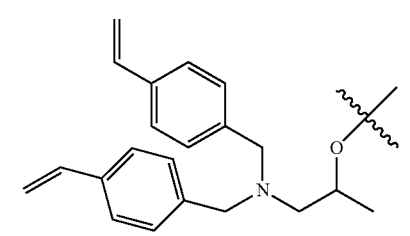

(V)

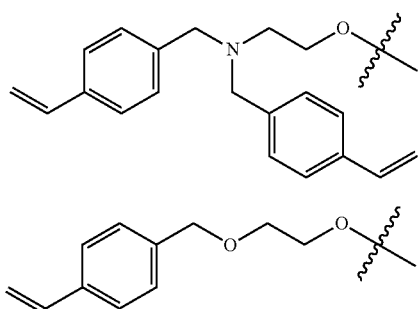

(VI)

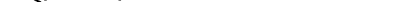

The styrene-containing group (e.g. Groups (II) to (VI) above) may be formed by reacting a styrene-containing mono-alcohol or mono-amine with the polyurethane pre-polymer. For example, the styrene-containing monoalcohol may react with terminal —N=C=O groups on the polyurethane pre-polymer. Styrene-containing mono-alcohols corresponding to Groups (II) to (VI) above may be:

(II')

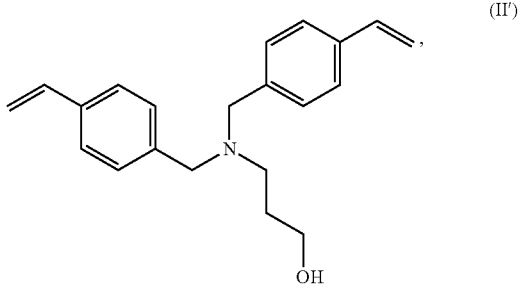

(III')

(IV')

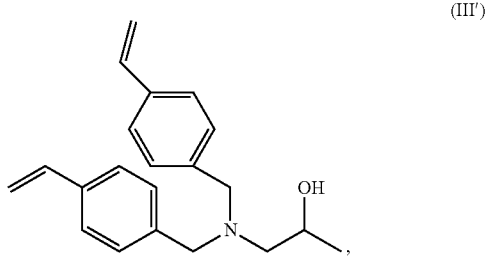

(V')

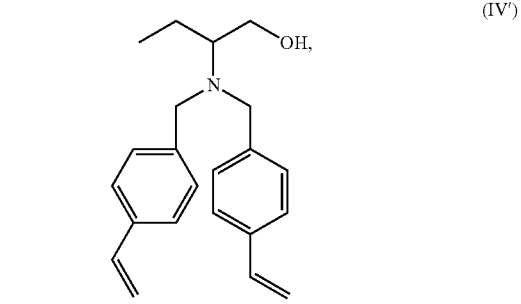

(VI')

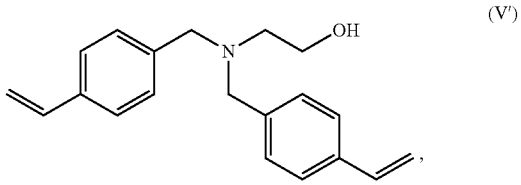

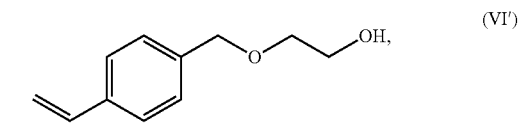

The styrene-containing mono-alcohols may be prepared using any suitable methods. For example, in the case of compound (V') (2-[di-(4-vinylbenzylamino)]ethanol; VBAE), this styrene-containing mono-alcohol may be prepared from the reaction of 4-vinylbenzyl halide (e.g. chloride) with ethanolamine. In some examples, the reaction may be carried out in the presence of an alkali metal carbonate and acetonitrile under reflux. As an example, the following reaction sequence may be employed:

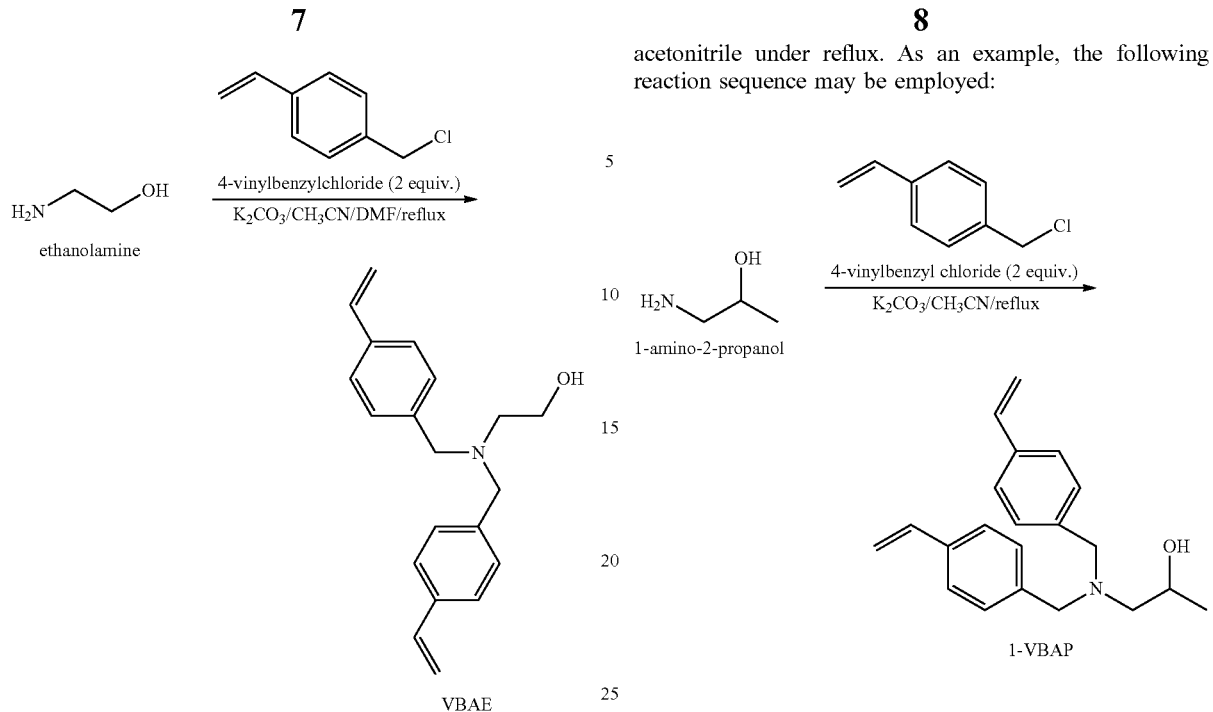

VBAE

As a further example, the compound (II') (3-[di-4-vinyl-benzylamino)]propanol; DVAP) may be prepared from the reaction of 4-vinylbenzyl halide (e.g. chloride) with 3-aminopropanol. In some examples, the reaction may be carried out in the presence of an alkali metal carbonate and acetonitrile under reflux. As an example, the following reaction sequence may be employed:

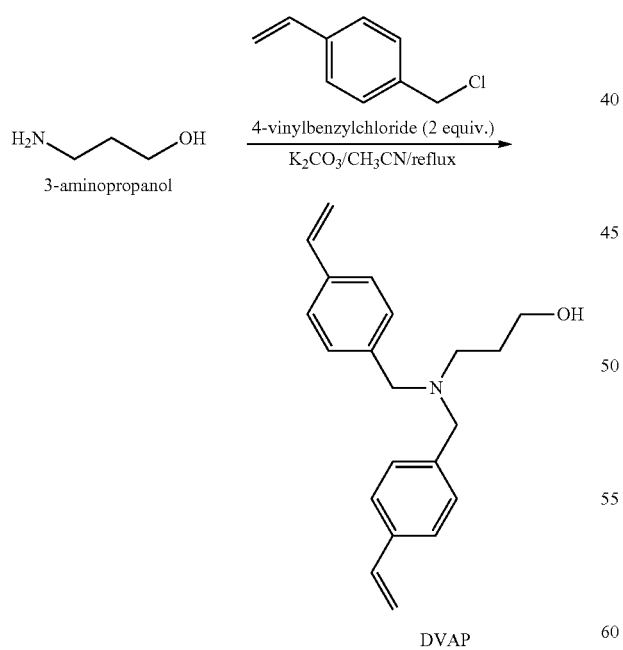

DVAP

As yet another example, the compound (III') (1-(di(4-vinylbenzylamino)]-2-propanol; 1-VBAP) may be prepared by the reaction of 4-vinylbenzyl halide (e.g. chloride) with 1-amino-2-propanol. In some examples, the reaction may be carried out in the presence of an alkali metal carbonate and acetonitrile under reflux. As an example, the following reaction sequence may be employed:

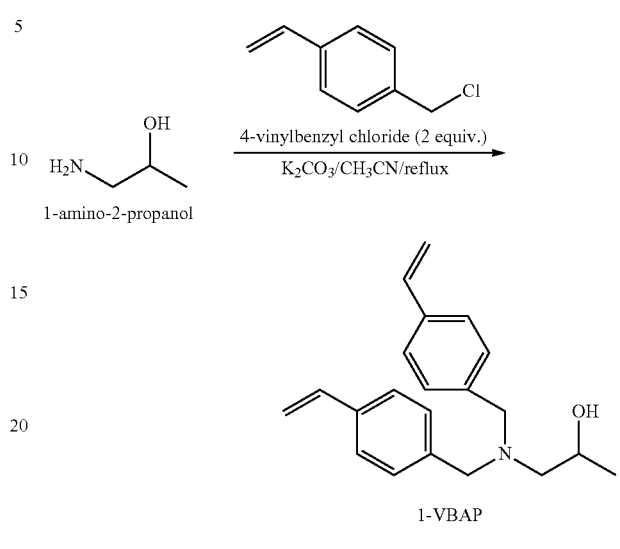

1-VBAP

Where the capping group comprises an allyl-containing group, the allyl-containing group may comprise an allyl ether group or an allyl amine group. Suitable allyl-containing capping groups include:

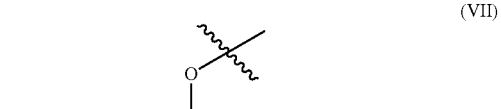 (VII)

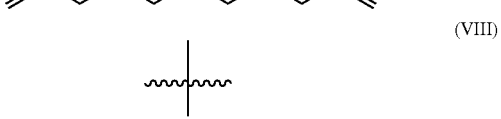 (VIII)

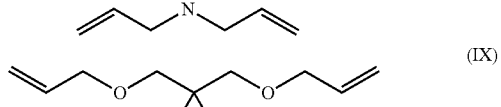 (IX)

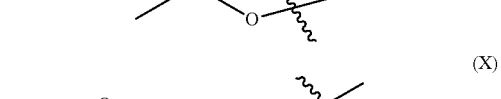 (X)

$CH_2\!=\!CHCH_2O\!-\!$ (XI)

$CH_2\!=\!CHCH_2NH\!-\!$ (XII)

$CH_2\!=\!CHOCH_2CH_2CH_2NH\!-\!$ (XIII)

The allyl-containing group (e.g. groups (VII) to (XIII) above) may be formed by reacting suitable allyl-containing mono-alcohols or monoamines with a polyurethane pre-polymer. For example, the allyl-containing monoalcohol or monoamine may react with terminal —N=C=O groups on the polyurethane pre-polymer. Allyl-containing mono-alcohols or monoamines corresponding to groups (VII) to (XIII) above may be:

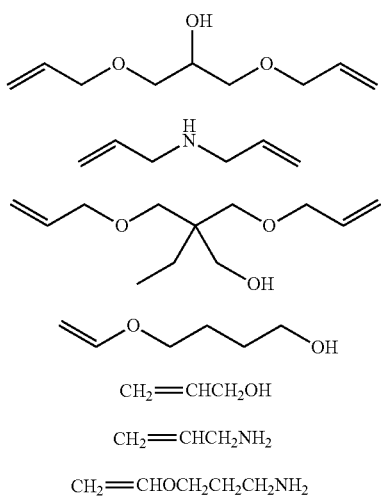

(VII')

(VIII')

(IX')

(X')

CH₂=CHCH₂OH (XI')

CH₂=CHCH₂NH₂ (XII')

CH₂=CHOCH₂CH₂CH₂NH₂ (XIII')

Where the polyurethane dispersion comprises polyurethane polymers that comprise polyurethane backbones having terminal groups selected from acrylamide-containing groups, styrene-containing groups, and allyl-containing groups, the dispersion may be devoid of polyurethane polymers that comprise polyurethane backbones having terminal methacrylate-containing or acrylate-containing groups.

Where the polyurethane dispersion comprises polyurethane polymers comprising terminal allyl-containing groups, the polyurethane backbones may comprise reactive side groups comprising acrylamide, styrene, acrylate and/or methacrylate groups. In some examples, allyl groups are not the only reactive groups pendant as side and terminal groups from the polyurethane chain. The acrylamide, styrene, acrylate and/or methacrylate side groups may enhance the curability of the polyurethane by, for example, electron beam curing.

In the polyurethane that is dispersed in the inkjet composition, 1 to 99 weight % of the terminal or capping groups may be ionic groups, while 99 to 1 weight % of the terminal or capping groups may be selected from an acrylamide-containing group, a styrene-containing group, and an allyl-containing group. In some examples, 5 to 70 weight % of the capping groups may be ionic groups, while 95 to 30 weight % of the capping groups may be selected from an acrylamide-containing group, a styrene-containing group, and an allyl-containing group. In some examples, 10 to 50 weight % of the capping groups may be ionic groups, while 90 to 50 weight % of the capping groups may be selected from an acrylamide-containing group, a styrene-containing group, and an allyl-containing group. In other examples, 20 to 40 weight % of the capping groups may be ionic groups, while 80 to 60 weight % of the capping groups may be selected from an acrylamide-containing group, a styrene-containing group, and an allyl-containing group.

In one example, the polyurethane dispersion may comprise at least one polyurethane polymer comprising a polyurethane backbone that is capped at one end with a terminal (or capping) group selected from an acrylamide-containing group, a styrene-containing group, and an allyl-containing group and capped at the opposite end with a terminal ionic group.

In one example, the polyurethane dispersion may comprise (i) at least one polyurethane polymer comprising a polyurethane backbone that is capped at one end with a terminal (or capping) group selected from an acrylamide-containing group, a styrene-containing group, and an allyl-containing group and capped at the opposite end with a terminal ionic group; and (ii) at least one polyurethane polymer comprising a polyurethane backbone that is capped at both ends with a terminal (or capping) group selected from an acrylamide-containing group, a styrene-containing group, and an allyl-containing group or (iii) at least one polyurethane polymer comprising at least one polyurethane polymer comprising a polyurethane backbone that is capped at both ends with ionic groups.

In one example, the polyurethane dispersion may comprise (i) at least one polyurethane polymer comprising a polyurethane backbone that is capped at one end with a terminal (or capping) group selected from an acrylamide-containing group, a styrene-containing group, and an allyl-containing group and capped at the opposite end with a terminal ionic group; (ii) at least one polyurethane polymer comprising a polyurethane backbone that is capped at both ends with a terminal (or capping) group selected from an acrylamide-containing group, a styrene-containing group, and an allyl-containing group and (iii) at least one polyurethane polymer comprising at least one polyurethane polymer comprising a polyurethane backbone that is capped at both ends with ionic groups.

The ionic group may comprise a carboxylic acid group, a carboxylate group, a sulphonic acid group and/or a sulphonic acid group. The ionic group may be formed by reacting an amino carboxylic acid or an amino sulphonic with a polyurethane pre-polymer, for example, with terminal —N=C=O groups on the polyurethane pre-polymer. Suitable amino sulphonic acids include taurine. Other examples of suitable amino sulphonic acids include acids (A), also termed "CAPS" and (B), also termed "CHES" below:

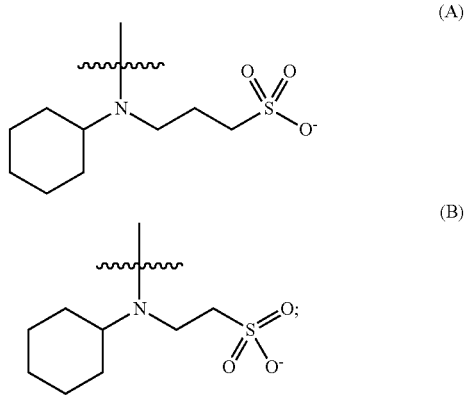

and

For the avoidance of doubt, the CAPS and CHES groups ((A) and (B), respectively) may be present in anionic form.

The ionic groups may help to keep the polyurethane particles in dispersion in water.

The polyurethane polymers present in the pH stable polyurethane dispersion may be formed from the reaction between a reactive diol and a diisocyanate. The reactive diol may be selected from an acrylate-containing diol, a methacrylate-containing diol, acrylamide-containing diol, styrene-containing diol and/or allyl-containing diol. As will be appreciated by a person skilled in the art, the acrylate, methacrylate, acrylamide, styrene and allyl groups may provide the polymer with reactive side groups that may be crosslinked when the polyurethane is cured.

Suitable methacrylate-containing and acrylate-containing reactive diols include:

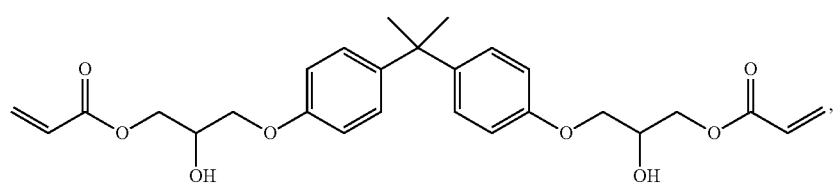
(BGDA-XVII)

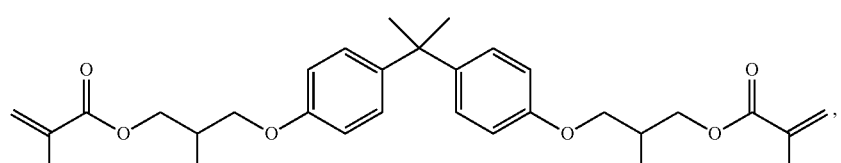
(XVIII)

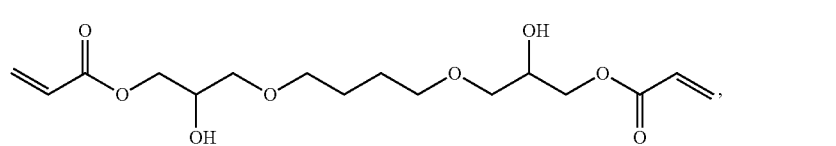
(XIX)

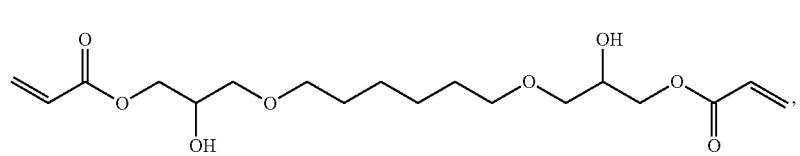
(XX)

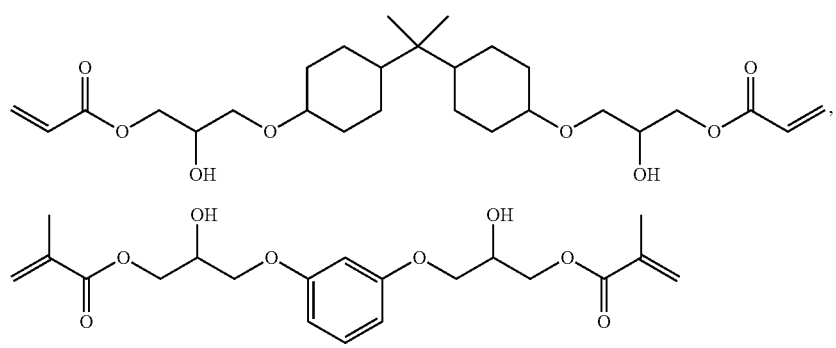
(XXI)

(XXII)

The reactive diol may also be a styrene-containing reactive diol selected from:

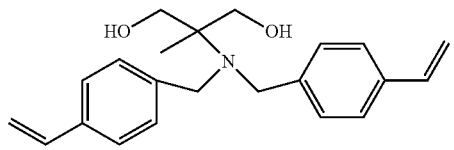
(XXIII)

and

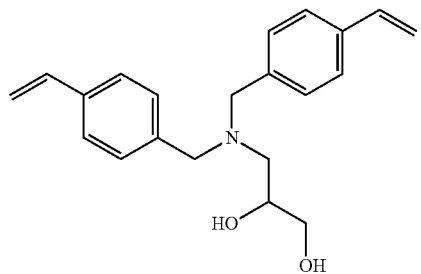
(XXIV)

The styrene-containing diols above may be prepared using any suitable methods. For example, where the diol comprises a compound of the formula (XXIII) (2-[di-(4-vinylbenzyl)amino]-2-methyl-1,3-propanediol; VAMPB) above, the diol may be synthesised from the reaction of 4-vinylbenzyl halide (e.g. chloride) with 2-amino-2-methyl-1,3-propanediol. The reaction may be carried out in the presence of an alkali metal carbonate (e.g. potassium carbonate) and acetonitrile. An example of a suitable reaction scheme is shown below.

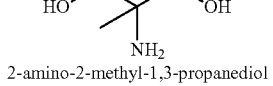
2-amino-2-methyl-1,3-propanediol

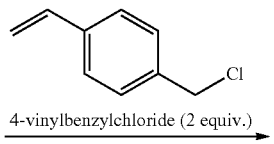
$\xrightarrow{\text{4-vinylbenzylchloride (2 equiv.)}}{K_2CO_3/CH_3CN/reflux}$

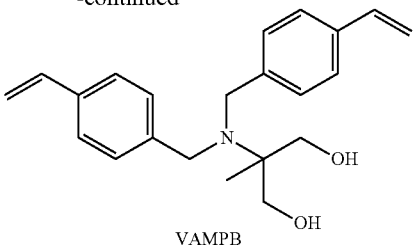

VAMPB

Where the diol comprises a compound of the formula (XXIV) (3-[di-(4-vinylbenzyl)amino]-1,2-propanediol; VBAP) above, the diol may be synthesised from the reaction of 4-vinylbenzyl halide (e.g. chloride) with 3-amino-1,2-propanediol. The reaction may be carried out in the presence of an alkali metal carbonate (e.g. potassium carbonate) and acetonitrile. An example of a suitable reaction scheme is shown below.

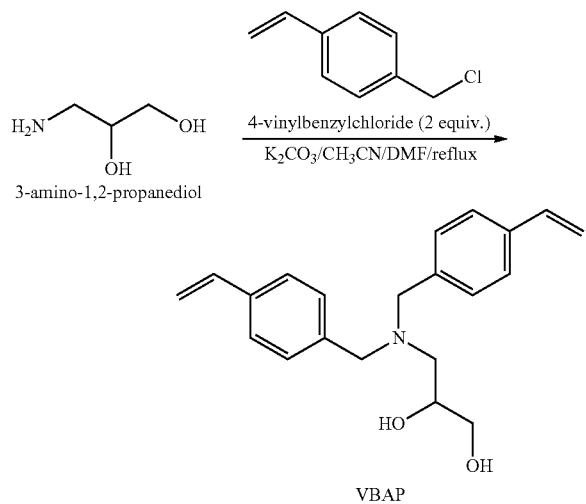

VBAP

The reactive diol may also be an allyl-containing containing diol selected from:

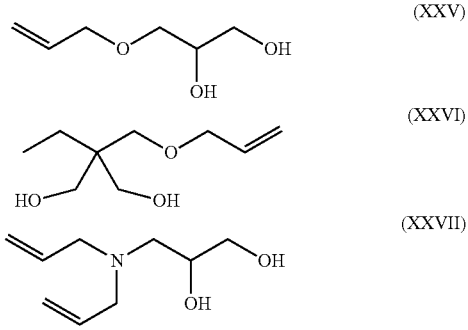

(XXV)

(XXVI)

(XXVII)

Suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, trimethylhexamethylene diisocyanate and mixtures thereof.

In one example, the diisocyanate is selected from at least one of 2,2,4-trimethyl hexamethylene diisocyanate, isophorone diisocyanate, hexamethylene diisocyanate, methylene diphenyl diisocyanate and 4,4'-Methylene dicyclohexyl diisocyanate.

A blend of two diisocyanates may be used. For example, the diisocyanates may be a blend of 4,4'-Methylene dicyclohexyl diisocyanate and hexamethylene diisocyanate The polyurethane backbone may be devoid of any ionic side groups, for example, acid stabilisation groups (e.g. carboxylic or sulphonic acid groups). Such ionic groups may act as capping groups at the terminal end(s) of at least some of the polyurethane polymer strands in the polyurethane dispersion.

In one example, the polyurethane dispersion is formed by reacting a reactive diol with a diisocyanate to form a polyurethane pre-polymer. A polymerisation initiator may be used to initiate polymerisation. The NCO/OH ratio may range from greater to 1 to 8, for example, 1.2 to 5.

The polymerisation may be carried out to produce a polyurethane pre-polymer. The pre-polymer may comprise at least one terminal —N=C=O group. Once the polyurethane pre-polymer is formed, a capping agent may be added to the reaction mixture. For example, the capping agent may be a monoalcohol or monoamine e.g. selected from a methacrylate-containing monoalcohol, an acrylate-containing monoalcohol, an acrylamide-containing monoalcohol, a styrene-containing monoalcohol, an allyl-containing monoalcohol or an allyl-containing monoamine. The monoalcohol or monoamine may react with terminal —N=C=O groups on the polyurethane pre-polymer to cap the polyurethane pre-polymer. The reaction is carried out such that at least some of the polyurethane pre-polymer strands are capped by this reaction. In some examples, most of the polyurethane pre-polymer strands are capped by this reaction. For example, at least 10% of unreacted —N=C=O groups are capped by this reaction. In some instances, 50 to 99%, for instance, 60 to 95% or 65 to 90% of unreacted —N=C=O groups are capped by this reaction.

An amino carboxylic acid or an amino sulphonic acid may then be added to the reaction mixture. As mentioned above, suitable acids include taurine, 3-(cyclohexylamino)-1-propanesulfonic acid and 2-(cyclohexylamino)ethanesulfonic acid. The amino carboxylic acid or amino sulphonic acid may react with the remaining —N=C=O groups. These groups form can form ionic capping groups that help to stabilise the dispersion of polyurethane in e.g. water.

The polyurethane may have an acid number of 20 to 100. The pH stable curable polyurethane may have a double bond density from 1.5 to 1.0 meq/g.

The particle size range of the polyurethane dispersion may be 10 to 200 nm, for example, 12 to 170 nm.

Polyurethane Polymer (b)

The curable polyurethane dispersion may comprise b) a polyurethane polymer comprising a terminal group selected from at least one of the stabilising groups (A), also termed "CAPS", and (B), also termed "CHES", below:

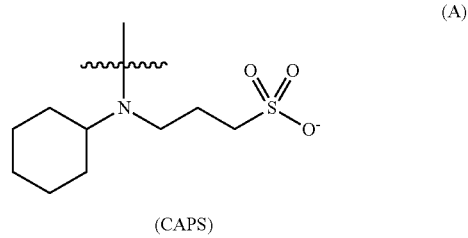

(A)

(CAPS)

-continued

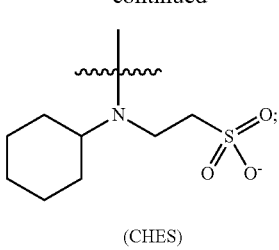

(CHES) (B)

For the avoidance of doubt, the stabilising groups (A) and (B) may be present in acid form, for instance, as:

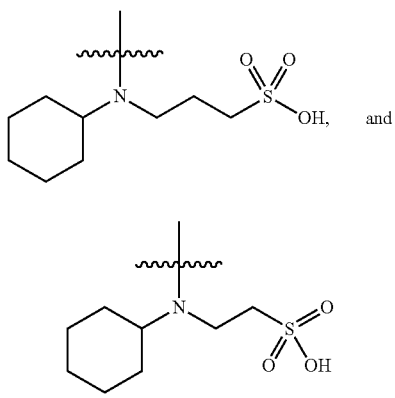

In one example, the polyurethane dispersion may comprise at least one polyurethane polymer comprising a polyurethane backbone having at least one terminal (or capping) group selected from the stabilising groups (A) and/or (B) above, and at least one polyurethane polymer comprising a polyurethane backbone having at least one terminal (or capping) group selected from a methacrylic-containing group, an acrylate-containing group, a styrene-containing group, an allyl-containing group and an acrylamide-containing group; and/or a polyurethane that comprises a polyurethane backbone that is capped at one end with the stabilising group (A) and/or (B) and at the other end with a terminal group selected from a methacrylic-containing group, an acrylate-containing group, a styrene-containing group, an allyl-containing group and an acrylamide-containing group.

In some examples, the polyurethane polymer comprises a polyurethane that comprises a polyurethane backbone that is capped at one end with the stabilising group (A) and/or (B) and at the other end with a terminal group selected from a methacrylic-containing group, an acrylate-containing group, a styrene-containing group, an allyl-containing group and an acrylamide-containing group.

In the polyurethane that is dispersed in the ink and/or overcoat composition 1 to 99 weight % of the terminal or capping groups may be CAPS and/or CHES, while 99 to 1 weight % of the terminal or capping groups may be selected from an acrylate-containing group, a methacrylic-containing group, a styrene-containing group, an allyl-containing group and an acrylamide-containing group. In some examples, 5 to 70 weight % of the capping groups may be CAPS and/or CHES, while 95 to 30 weight % of the capping groups may be selected from an acrylate-containing group, a methacrylic-containing group, a styrene-containing group, an allyl-containing group and an acrylamide-containing group. In some examples, 10 to 50 weight % of the capping groups may be CAPS and/or CHES, while 90 to 50 weight % of the capping groups may be selected from an acrylate-containing group, a methacrylic-containing group, a styrene-containing group, an allyl-containing group and an acrylamide-containing group. In some examples, 20 to 40 weight % of the capping groups may be CAPS and/or CHES, while 80 to 60 weight % of the capping groups may be selected from an acrylate-containing group, methacrylic-containing group, a styrene-containing group, an allyl-containing group and an acrylamide-containing group.

In one example, the polyurethane dispersion may comprise (i) at least one polyurethane polymer comprising a polyurethane backbone that is capped at one end with a terminal (or capping) group selected from a methacrylic-containing group, an acrylate-containing group, a styrene-containing group, an allyl-containing group and an acrylamide-containing group, and capped at the opposite end with a terminal CAPS or CHES group; and (ii) at least one polyurethane polymer comprising a polyurethane backbone that is capped at both ends with a terminal (or capping) group selected from a methacrylic-containing group, an acrylate-containing group, a styrene-containing group, an allyl-containing group and an acrylamide-containing group or (iii) at least one polyurethane polymer comprising at least one polyurethane polymer comprising a polyurethane backbone that is capped at both ends with terminal groups selected from CAPS and/or CHES groups.

In one example, the polyurethane dispersion may comprise (i) at least one polyurethane polymer comprising a polyurethane backbone that is capped at one end with a terminal (or capping) group selected from a methacrylic-containing group, an acrylate-containing group, a styrene-containing group, an allyl-containing group and an acrylamide-containing group and capped at the opposite end with a terminal CAPS or CHES group; (ii) at least one polyurethane polymer comprising a polyurethane backbone that is capped at both ends with a terminal (or capping) group selected from a methacrylic-containing group, an acrylate-containing group, a styrene-containing group, an allyl-containing group and an acrylamide-containing group and (iii) at least one polyurethane polymer comprising at least one polyurethane polymer comprising a polyurethane backbone that is capped at both ends with terminal groups selected from CAPS and/or CHES groups.

Suitable acrylate- or methacrylate-containing capping groups may include

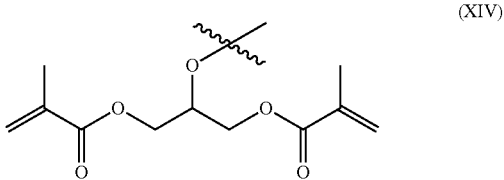

(XIV)

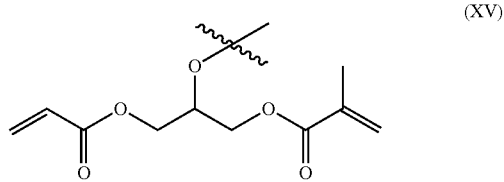

(XV)

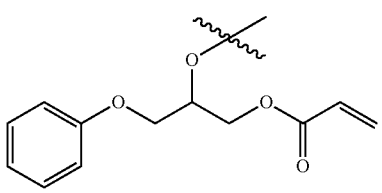

(XVI)

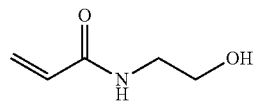

(N-Hydroxyethyl acrylamide, HEAA)

The methacrylate- and acrylate-containing groups (e.g. Groups (XIII) to (XIVI) above) may be formed by reacting suitable methacrylate/acrylate-containing mono-alcohols or monoamines with a polyurethane pre-polymer, for example, with —N=C=O terminal groups on the pre-polymer. Suitable methacrylate/acrylate-containing mono-alcohols corresponding to groups (XIII) to (XIVI) above include:

Where the capping group comprises a styrene-containing group, suitable styrene-containing capping groups may include:

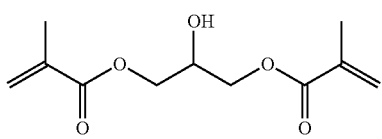

(XIV′)

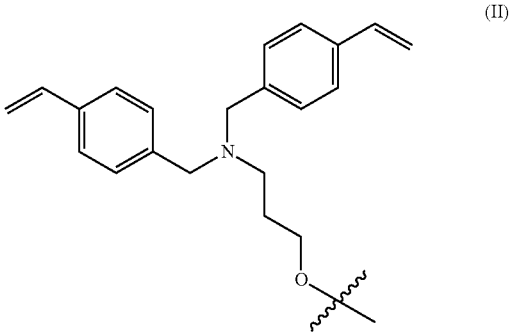

(II)

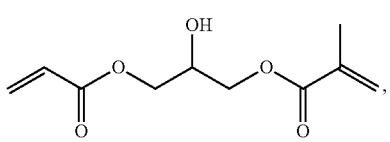

(XV′)

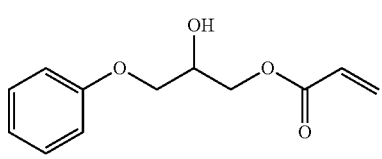

(XVI′)

(III)

Suitable terminal acrylamide-containing groups, styrene-containing groups and allyl-containing groups are described in relation to polyurethane polymer (a) above.

Where the terminal or capping group is an acrylamide, the acrylamide-containing capping group may be CH$_2$=CHC(O)NH(CH$_2$)O—, wherein n is an integer from 1 to 10. In some examples, n is 1 to 6, for instance, 1 to 4. In one example, the acrylamide-containing capping group may be:

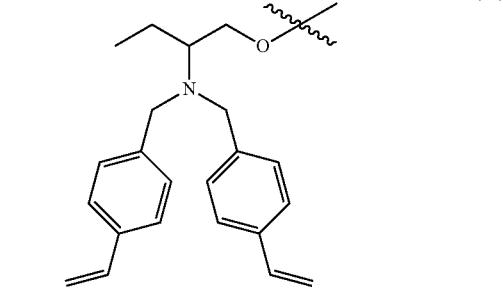

(IV)

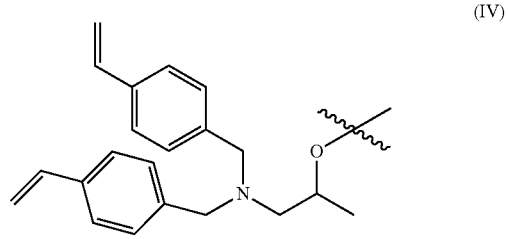

(V)

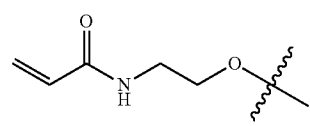

(I)

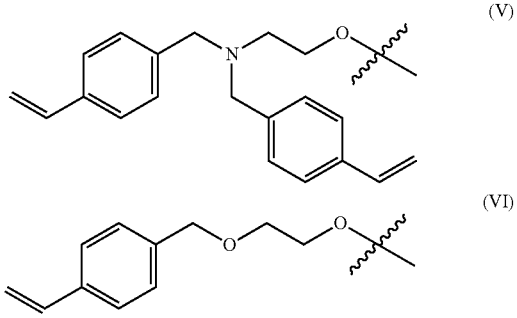

(VI)

Acrylamide-containing groups (e.g. Group (I) above) may be formed by reacting a polyurethane pre-polymer with an acrylamide-containing monoalcohol or monoamine. For example, the acrylamide-containing monoalcohol may react with terminal —N=C=O groups on the polyurethane pre-polymer. An example of a suitable acrylamide-containing mono-alcohol may be:

Styrene-containing groups (e.g. Groups (II) to (VI) above) may be formed by reacting suitable styrene-containing mono-alcohols or monoamines with the polyurethane pre-polymer. For example, the styrene-containing monoalcohol may react with terminal —N=C=O groups on the polyurethane pre-polymer. Styrene-containing mono-alcohols corresponding to Groups (II) to (VI) above may be:

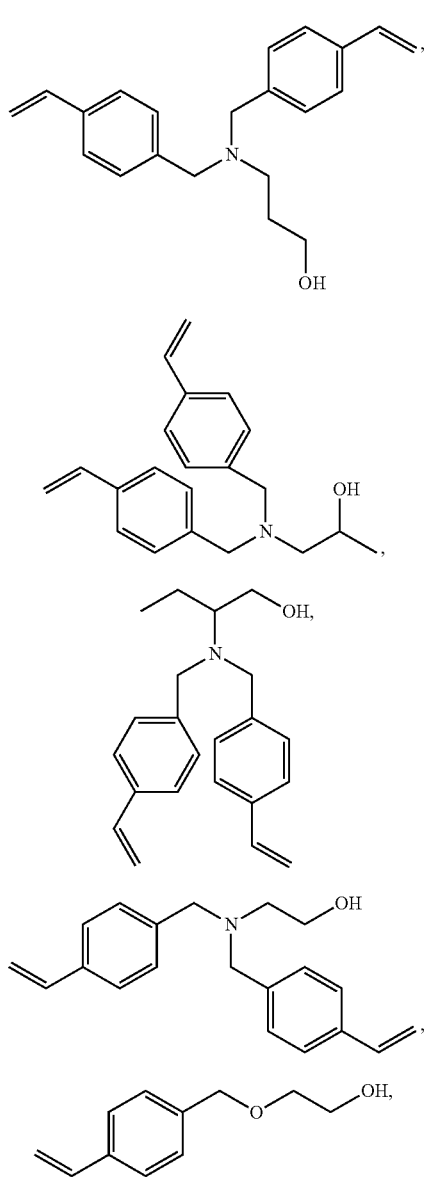

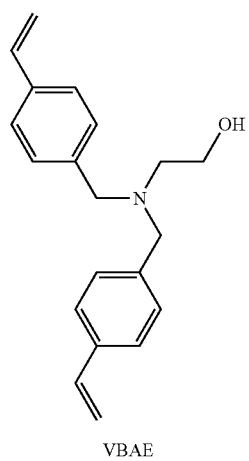

VBAE

As a further example, the compound (II') (3-[di-4-vinyl-benzylamino)]propanol; DVAP) may be prepared from the reaction of 4-vinylbenzyl halide (e.g. chloride) with 3-aminopropanol. In some examples, the reaction may be carried out in the presence of an alkali metal carbonate and acetonitrile under reflux. As an example, the following reaction sequence may be employed:

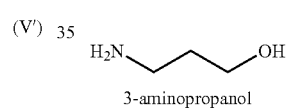

The styrene-containing mono-alcohols may be prepared using any suitable methods. For example, in the case of compound (V') (2-[di-(4-vinylbenzylamino)]ethanol; VBAE), this styrene-containing mono-alcohol may be prepared from the reaction of 4-vinylbenzyl halide (e.g. chloride) with ethanolamine. In some examples, the reaction may be carried out in the presence of an alkali metal carbonate and acetonitrile under reflux. As an example, the following reaction sequence may be employed:

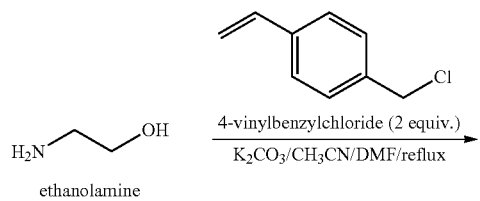

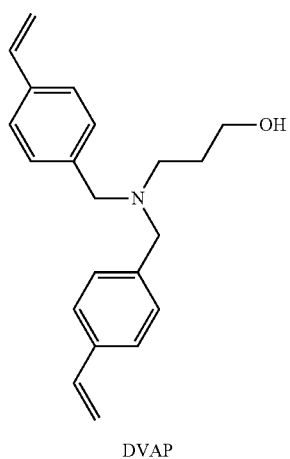

DVAP

As yet another example, the compound (III) (1-(di(4-vinylbenzylamino)]-2-propanol; 1-VBAP) may be prepared by the reaction of 4-vinylbenzyl halide (e.g. chloride) with 1-amino-2-propanol. In some examples, the reaction may be carried out in the presence of an alkali metal carbonate and acetonitrile under reflux. As an example, the following reaction sequence may be employed:

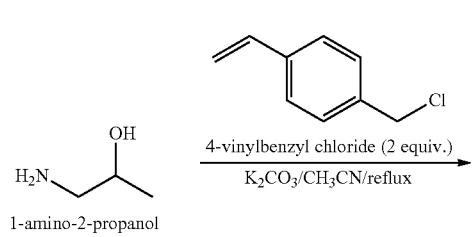

1-VBAP

Where the capping group comprises an allyl-containing group, the allyl-containing group may comprise an allyl ether group or an allyl amine group. Suitable allyl-containing capping groups include:

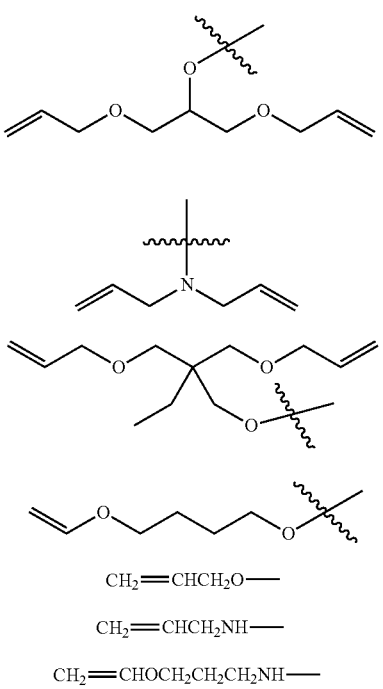

(VII)

(VIII)

(IX)

(X)

CH₂=CHCH₂O— (XI)

CH₂=CHCH₂NH— (XII)

CH₂=CHOCH₂CH₂CH₂NH— (XIII)

The allyl-containing groups (e.g. Groups (VII) to (XIII) above) may be formed by reacting suitable allyl-containing mono-alcohols or monoamines with a polyurethane pre-polymer. For example, the allyl-containing monoalcohol or monoamine may react with terminal —N=C=O groups on the polyurethane pre-polymer. Allyl-containing mono-alcohols or monoamines corresponding to Groups (VII) to (XIII) above may be:

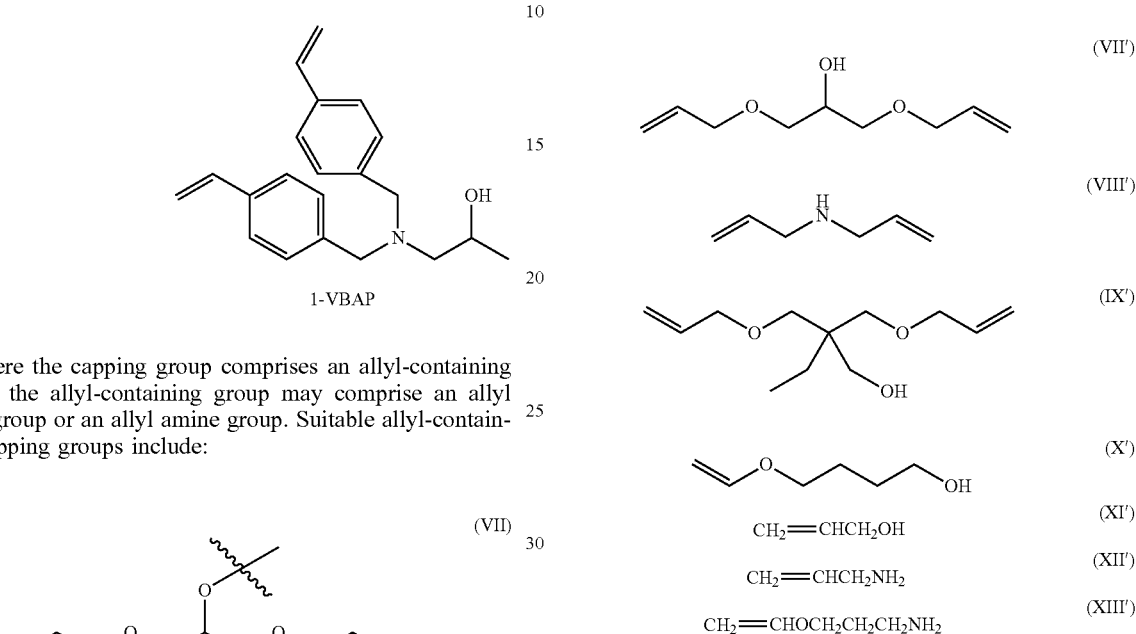

(VII')

(VIII')

(IX')

(X')

CH₂=CHCH₂OH (XI')

CH₂=CHCH₂NH₂ (XII')

CH₂=CHOCH₂CH₂CH₂NH₂ (XIII')

Where the polyurethane dispersion comprises polyurethane polymers having terminal allyl-containing groups, the polyurethane backbones may comprise reactive side groups comprising acrylamide, styrene, acrylate and/or methacrylate groups. In some examples, allyl groups are not the only reactive groups pendant from the polyurethane chain. This may enhance the curability of the polyurethane by, for example, electron beam curing.

The polyurethane polymers present in the polyurethane dispersion may be formed from the reaction between a reactive diol and a diisocyanate. The reactive diol may be selected from an acrylate-containing diol, a methacrylate-containing diol, acrylamide-containing diol, styrene-containing diol and/or allyl-containing diol. As will be appreciated by a person skilled in the art, the acrylate, methacrylate, acrylamide, styrene and allyl groups may provide the polymer with reactive side groups that may be crosslinked when the polyurethane is cured.

Suitable methacrylate-containing and acrylate-containing reactive diols include:

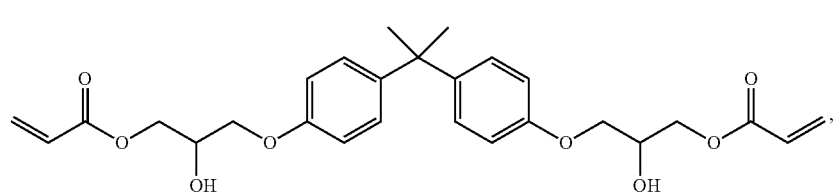

(BGDA-XVII)

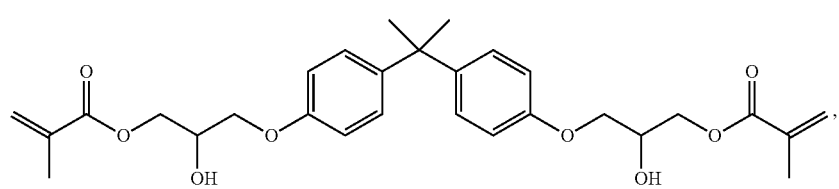
(XVIII)

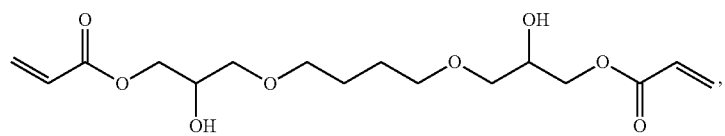
(XIX)

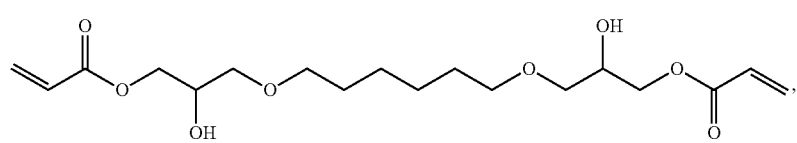
(XX)

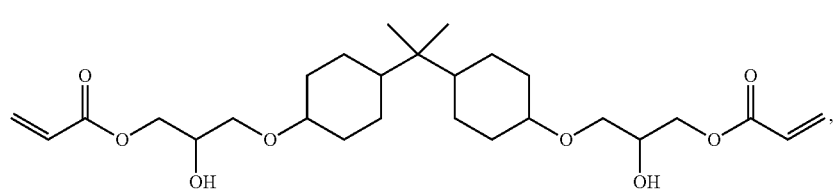
(XXI)

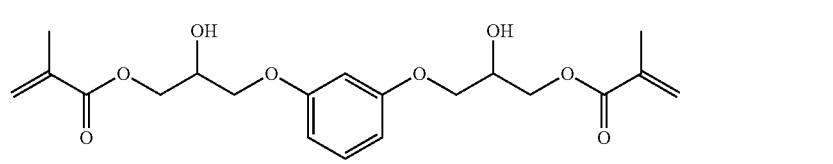
(XXII)

The reactive diol may also be a styrene-containing reactive diol selected from:

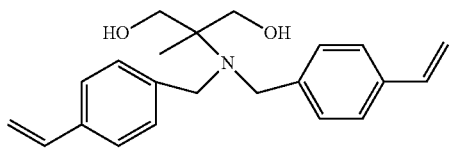
(XXIII)

and

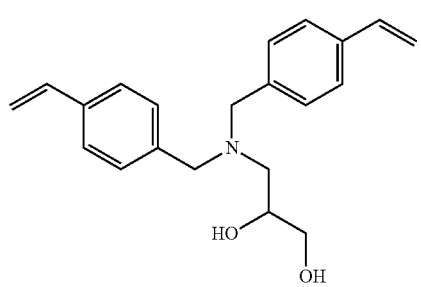
(XXIV)

The styrene-containing diols above may be prepared using any suitable methods.

For example, where the diol comprises a compound of the formula (XXIII) (2-[di-(4-vinylbenzyl)amino]-2-methyl-1,3-propanediol; VAMPB) above, the diol may be synthesised from the reaction of 4-vinylbenzyl halide (e.g. chloride) with 2-amino-2-methyl-1,3-propanediol. The reaction may be carried out in the presence of an alkali metal carbonate (e.g. potassium carbonate) and acetonitrile. An example of a suitable reaction scheme is shown below.

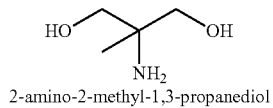
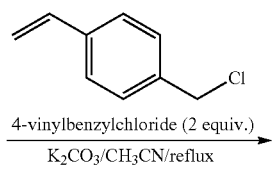
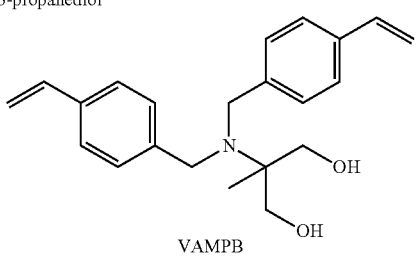
VAMPB

Where the diol comprises a compound of the formula (XXIV) (3-[di-(4-vinylbenzyl)amino]-1,2-propanediol; VBAP) above, the diol may be synthesised from the reaction of 4-vinylbenzyl halide (e.g. chloride) with 3-amino-1,2-propanediol. The reaction may be carried out in the presence of an alkali metal carbonate (e.g. potassium carbonate) and acetonitrile. An example of a suitable reaction scheme is shown below.

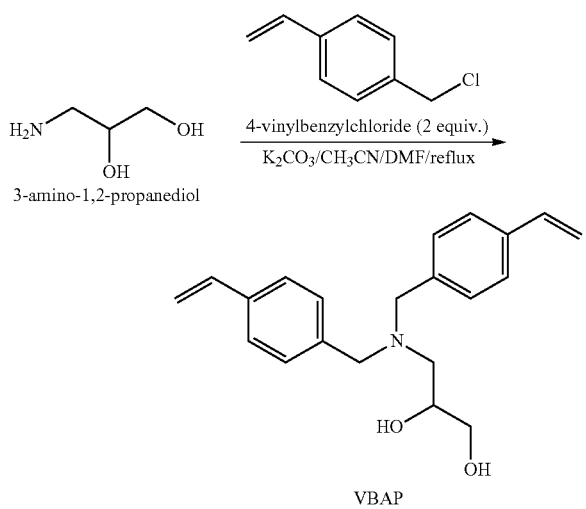

The reactive diol may also be an allyl-containing containing diol selected from:

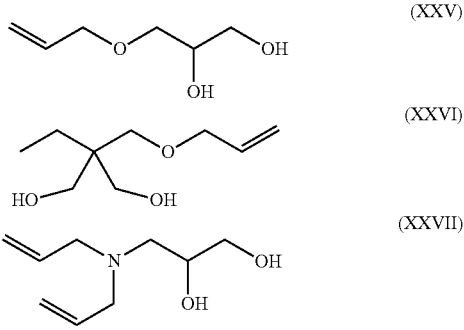

Suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, trimethylhexamethylene diisocyanate and mixtures thereof.

In one example, the diisocyanate is selected from at least one of 2,2,4-trimethyl hexamethylene diisocyanate, isophorone diisocyanate, hexamethylene diisocyanate, methylene diphenyl diisocyanate and 4,4'-Methylene dicyclohexyl diisocyanate.

A blend of two diisocyanates may be used. For example, the diisocyanates may be a blend of 4,4'-Methylene dicyclohexyl diisocyanate and hexamethylene diisocyanate The polyurethane backbone may be devoid of any ionic side groups, for example, acid stabilisation groups (e.g. carboxylic or sulphonic acid groups). Such ionic groups may act as capping groups at the terminal end(s) of at least some of the polyurethane polymer strands in the polyurethane dispersion.

In one example, the polyurethane dispersion is formed by reacting a reactive diol with a diisocyanate to form a polyurethane pre-polymer. A polymerisation initiator may be used to initiate polymerisation. The NCO/OH ratio may range from greater to 1 to 8, for example, 1.2 to 5.

The polymerisation may be carried out to produce a polyurethane pre-polymer. Once the polyurethane pre-polymer is formed, a capping agent may be added to the reaction mixture. For example, the capping agent may be a monoalcohol or monoamine selected from a methacrylate-containing monoalcohol, an acrylate-containing monoalcohol, a acrylamide-containing monoalcohol, a styrene-containing monoalcohol, an allyl-containing monoalcohol or an allyl-containing monoamine. The monoalcohol or monoamine may react with terminal —N=C=O groups on the polyurethane pre-polymer to cap the polyurethane pre-polymer. The reaction is carried out such that at least some of the polyurethane pre-polymer strands are capped by this reaction. In some examples, most of the polyurethane pre-polymer strands are capped by this reaction. For example, at least 10% of unreacted —N=C=O groups are capped by this reaction. In some instances, 50 to 99%, for instance, 60 to 95% or 65 to 90% of unreacted —N=C=O groups are capped by this reaction.

An amino carboxylic acid or an amino sulphonic acid may then be added to the reaction mixture. As mentioned above, suitable acids include taurine, 3-(cyclohexylamino)-1-propanesulfonic acid and 2-(cyclohexylamino)ethanesulfonic acid. The amino carboxylic acid or amino sulphonic acid may react with the remaining —N=C=O groups. These groups form can form ionic capping groups that help to stabilise the dispersion of polyurethane in e.g. water.

The polyurethane may have an acid number of 20 to 100. The polyurethane may have a double bond density from 1.5 to 1.0 meq/g.

The particle size range of the polyurethane dispersion may be 10 to 200 nm, for example, 12 to 180 nm.

Polyurethane Polymer (c)

The polyurethane polymer may comprise c) a polyurethane polymer comprising a polyurethane chain formed by the polymerisation of (i) a blend of at least two different diisocyanates and (ii) a reactive diol. The reactive diol is a diol of the formula:

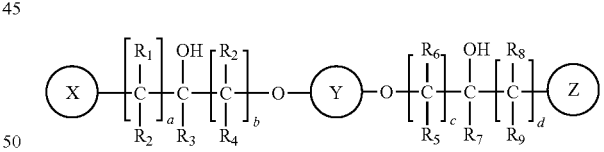

where:

$R_1$ to $R_9$ are each independently selected from H and an alkyl group, for example, a $C_1$ to $C_6$ alkyl group;

a, b, c and d are integers selected from the range 1 to 6, for example, 1 to 3;

X and Z are independently selected from methacrylate or acrylate groups of the formulae:

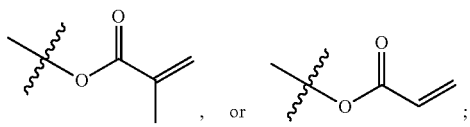

and

Y is an aliphatic moiety. The aliphatic moiety may be a hydrocarbyl moiety. The hydrocarbyl moiety may comprise an alkanediyl moiety or a cycloalkanedlyl moiety. The aliphatic (e.g. hydrocarbyl) moiety may include 2 to 30 carbon atoms, for example, 4 to 20 carbon atoms. The aliphatic (e.g. hydrocarbyl) moiety may be saturated or partially unsaturated. The aliphatic moiety may comprise a linear, branched and/or include a cycloaliphatic moiety. Y may be an aliphatic linker that comprises 1 to 5 cycloaliphatic groups, for example, 2 cycloaliphatic groups. Examples of cycloaliphatic groups include C5 to C12 aliphatic rings, for instance, a C6 aliphatic ring.

Examples of Y moieties include: —(CR'R")$_e$— moieties, where R' and R" are independently selected from H and C$_1$ to C$_3$ alkyl, and e is an integer from 2 to 20, for example, 4 to 10 or 4 to 6. Another example is:

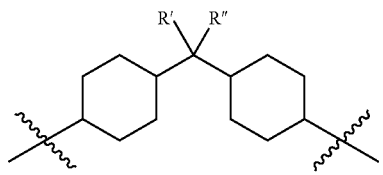

where R' and R" are defined above. For example, both R' and R" may be methyl.

In one example, the reactive diol is selected from:

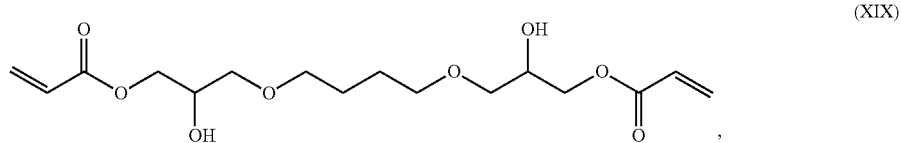

(XIX)

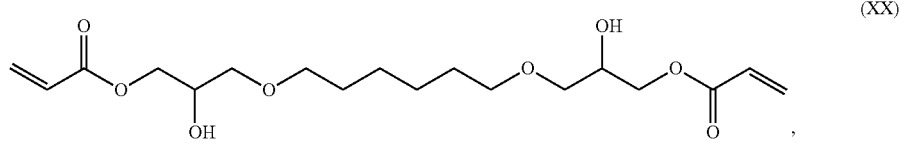

(XX)

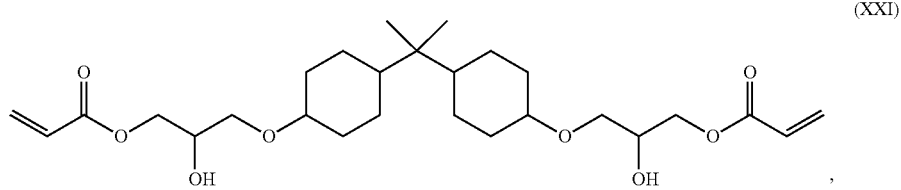

(XXI)

In some examples, Y is not:

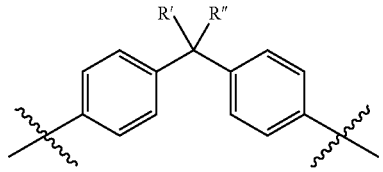

where R' and R" are both methyl.

In one example, the reactive diol is bisphenol A-free. For example, the reactive diol may exclude:

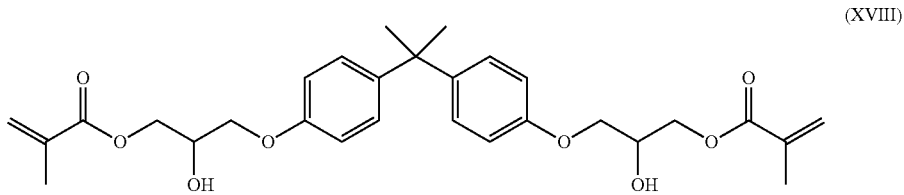 [SMILES: C=C(C)C(=O)OCC(O)COc1ccc(C(C)(C)c2ccc(OCC(O)COC(=O)C(=C)C)cc2)cc1]

(XVIII)

Suitable diisocyanates include methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, trimethylhexamethylene diisocyanate and mixtures thereof.

In one example, the diisocyanate is selected from at least one of 2,2,4-trimethyl hexamethylene diisocyanate, isophorone diisocyanate, hexamethylene diisocyanate, methylene diphenyl diisocyanate and 4,4'-Methylene dicyclohexyl diisocyanate.

A blend of two diisocyanates may be used. For example, the diisocyanates may be a blend of 4,4'-Methylene dicyclohexyl diisocyanate and hexamethylene diisocyanate.

In one example, the polyurethane dispersion is formed by reacting a reactive diol with the blend of at least diisocyanates to form a polyurethane pre-polymer. A polymerisation initiator may be used to initiate polymerisation. The NCO/OH ratio may range from greater to 1 to 8, for example, 1.2 to 5.

Once the polyurethane pre-polymer is formed, a capping agent may be added to the reaction mixture. For example, the capping agent may be a monoalcohol or monoamine selected from a methacrylate-containing monoalcohol, an acrylate-containing monoalcohol, a acrylamide-containing monoalcohol, a styrene-containing monoalcohol, an allyl-containing monoalcohol or an allyl-containing monoamine. The monoalcohol or monoamine may react with terminal —N=C=O groups on the polyurethane pre-polymer to cap the polyurethane pre-polymer. The reaction is carried out such that at least some of the polyurethane pre-polymer strands are capped by this reaction. In some examples, most of the polyurethane pre-polymer strands are capped by this reaction. For example, at least 10% of unreacted —N=C=O groups are capped by this reaction. In some instances, 60 to 90%, for instance, 70 to 85% of unreacted —N=C=O groups are capped by this reaction.

An amino carboxylic acid or an amino sulphonic acid may additionally or alternatively be used to cap the pre-polymer. As mentioned above, suitable acids include taurine, 3-(cyclohexylamino)-1-propanesulfonic acid and 2-(cyclohexylamino)ethanesulfonic acid. The amino carboxylic acid or amino sulphonic acid may react with the remaining —N=C=O groups. These groups form can form ionic capping groups that help to stabilise the dispersion of polyurethane in e.g. water.

The polyurethane may have an acid number of 20 to 100. The pH stable curable polyurethane may have a double bond density from 1.5 to 1.0 meq/g.

The particle size range of the polyurethane dispersion may be 10 to 200 nm, for example, 12 to 150 nm.

A 30 weight % dispersion of the polyurethanes in water may have a pH of 5 to 8, for example, 5.5 to 7.5.

Inkjet Composition

The inkjet composition of the present disclosure comprises a polyurethane dispersion and an aqueous carrier. The curable polyurethane (solids) that is dispersed in an inkjet ink composition may be present in the inkjet ink composition an amount of 0.1 to 30 or 20 weight % or 0.1 to 10 weight %, for example, 0.5 to 7 weight %, or 0.6 to 5 weight % of the total weight of the inkjet ink composition.

The aqueous carrier may be water. Water may be present in the inkjet ink composition in an amount of at least 30 weight %, for example, at least 40 or 50 weight %. In some examples, water may be present in the inkjet ink composition in an amount of at least 60 weight %. Water may be present in an amount of at most 99 weight %, for example, at most 95 weight %. In some examples, water may be present in the inkjet ink composition in an amount of 30 to 99 weight %, for instance, 40 to 98 weight % or 50 to 95 weight %. In other examples, water may be present in an amount of 60 to 93 weight %, for instance, 70 to 90 weight %.

The inkjet composition may also include a surfactant. Any suitable surfactant may be present. Suitable surfactants are described in relation to the overcoat composition above. When present, the surfactant present in the inkjet ink composition in an amount ranging from about 0.01 wt % to about 5 wt % based on the total wt % of the inkjet composition.

The inkjet composition may include a co-solvent in addition to water. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate.

A single co-solvent may be used, or several co-solvents may be used in combination. When included, the co-solvent(s) is/are present in total in an amount ranging from 0 wt % to 60 wt %, depending on the jetting architecture, though amounts outside of this range can also be used. As other example, the co-solvent(s) may range from about 1 wt % to about 30 wt % or about 20 wt % of the total wt % of the inkjet composition.

The inkjet composition may also include various other additives to enhance the properties of the ink composition for specific applications. Examples of these additives include those added to inhibit the growth of microorganisms, viscosity modifiers, materials for pH adjustment, sequestering agents, anti-kogation agents, preservatives, and the like. Such additives may be present in an amount of 0 to 5 wt % of the inkjet composition.

The inkjet composition may be devoid of colorant. Alternatively, a colorant may be present. Any suitable colorant may be used. The colorant may be a pigment or a dye. In some examples, the colorant can be present in an amount from about 0.5 wt % to about 15 wt % based on a total wt % of the inkjet ink composition. In one example, the colorant can be present in an amount from about 1 wt % to about 10 wt %. In another example, the colorant can be present in an amount from about 5 wt % to about 10 wt %.

In other examples, the colorant may be a pigment or dye. In some examples, the colorant may be a pigment. As used herein, "pigment" generally includes organic or inorganic pigment colorants, magnetic particles, aluminas, silicas, and/or other ceramics, organo-metallics or other opaque particles, whether or not such particulates impart color. Thus, although the present description primarily illustrates the use of pigment colorants, the term "pigment" can be used more generally to describe pigment colorants, as well as other pigments such as organometallics, ferrites, ceramics, etc.

Suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683. HELIOGEN® Green L 9140, CHROMOPHTAL® Yellow 3G, CHROMOPHTAL® Yellow GR, CHROMOPHTAL® Yellow 8G, IGRAZIN® Yellow 5GT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH 1300, MONARCH 1100, MONARCH® 1000, MONARCH® 900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2. Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan colour pigment may include C.I. Pigment Blue −1, −2, −3, −15, −15:1, −15:2, −15:3, −15:4, −16, −22, and −60.

Specific examples of a magenta colour pigment may include C.I. Pigment Red −5, −7, −12, −48, −48:1, −57, −112, −122, −123, −146, −168, −177, −184, −202, and C.I. Pigment Violet-19.

Specific examples of a yellow pigment may include C.I. Pigment Yellow −1, −2, −3, −12, −13, −14, −16, −17, −73, −74, −75, −83, −93, −95, −97, −98, −114, −128, −129, −138, −151, −154, and −180. While several examples have been given herein, it is to be understood that any other pigment or dye can be used that is useful in modifying the colour of the UV curable ink.

Specific examples of black pigment include carbon black pigments. An example of an organic black pigment includes aniline black, such as C.I. Pigment Black 1.

In some examples, the pigment may be a cyan, magenta, black or yellow pigment.

In some examples, the inkjet composition may be substantially free from photoinitiator. For example, in food, beverage or pharmaceutical applications, the substantial absence of photoinitiators minimises the risk of photoinitiator migration from the ink into the product or packaging. In some examples, less than 0.1 weight % of photoinitiator may be present, for instance, 0 weight % of photoinitiator. In some examples, less than 0.1 weight % of photosensitizer may be present, for instance, 0 weight % of photosensitizer.

In some examples, on the other hand, photoinitiator may be present in the inkjet composition. For example, the photoinitiator may be present in the inkjet ink composition in an amount ranging from about 0.1 wt % to about 10 wt % based on a total wt % of the inkjet ink composition.

The water soluble photoinitiator may be a trimethylbenzoylphenylphosphinic acid metal salt (i.e., TPA salt) having a formula (I) of:

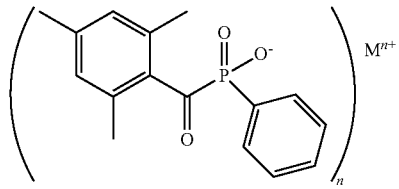

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

The TPA salt may be formed from ethyl (2,4,6-trimethylbenzoyl) phenylphosphinate (TPO-L) and a metal salt. The ethyl (2,4,6-trimethylbenzoyl) phenylphosphinate may be added to a suitable solvent (e.g., methyl ethyl ketone (MEK)) to form a solution, and then the metal salt may be added to the solution. The solution may be heated and stirred at a predetermined temperature for a predetermined time to allow the reaction to take place. As a result of the reaction, a solid TPA salt may form. This salt may be collected, washed, and dried.

Two example synthetic pathways for forming a lithium TPA salt (TPA-Li) and a sodium TPA salt (TPA-Na) are shown in the schemes below:

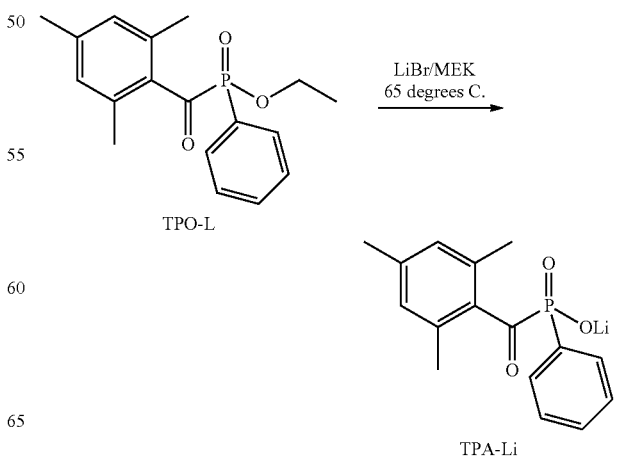

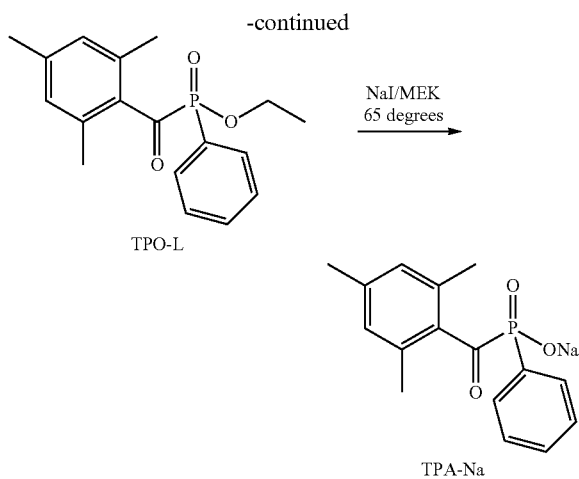

TPO-L

NaI/MEK
65 degrees
→

TPA-Na

The solubility of the water soluble photoinitiator disclosed herein may be high. In one example, the water soluble photoinitiator can have a water solubility of at least 0.1 wt %. When the water solubility is at least 0.1 wt %, it means that of the total wt % of the water soluble photoinitiator added to water, at least 0.1 wt % of the total is water soluble. In some instances, the water soluble photoinitiator may have a water solubility of at least 0.5 wt %. In some instances, the water soluble photoinitiator may have a water solubility up to about 20 wt %.

The water soluble photoinitiator may be used in combination with a sensitizer. The sensitizer may be a water soluble polymeric sensitizer that includes a functionalized anthrone moiety, a polyether chain, and an amide linkage or an ether linkage attaching one end of the polyether chain to the functionalized anthrone moiety. The anthrone moiety may be a thioxanthrenone moiety.

In one example, the polymeric sensitizer may have a formula (Q):

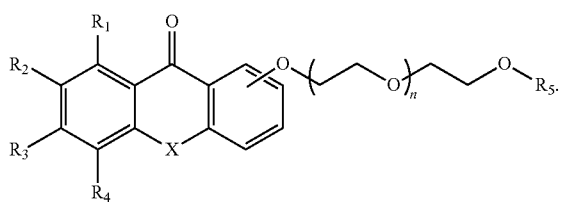

where $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In the formula Q above, X is O, S, or NH and the polyether chain has n number of repeating monomer units, where n ranges from 1 to 200. As shown in the formula Q above, the linkage is an ether linkage.

When present, the sensitizer may be present in an amount of 0.1 wt % to about 10 wt % of the inkjet ink composition.

In some examples, the inkjet composition may be used to form a durable image on a print substrate. For instance, once cured, the printed inkjet composition forms a durable image e.g. with good rub, solvent and/or scratch resistance.

In some examples, the inkjet composition may be pH stable. For example, the pH of the inkjet composition may remain substantially stable over time, improving the shelf-life of the inkjet composition. In some examples, the risk of colorants in the inkjet composition precipitating or crashing out due to fluctuations in pH may be reduced.

Printing Process

As described above, the present disclosure relates to a process that comprises inkjet printing an inkjet ink composition onto a substrate. Thereafter, the printed inkjet ink composition on the substrate is cured by exposure to radiation, for example, e-beam radiation or UV radiation. In some examples, e-beam is employed.

Prior to the inkjet printing the inkjet composition onto the substrate, the substrate may be treated, for example, with corona treatment. Prior to inkjet printing the inkjet composition onto the substrate, a fixer composition may be applied to the substrate. The fixer may help to optimise the deposition of pigment onto the print substrate. Suitable fixers may include one or more calcium salts and water. Examples of suitable calcium salts include calcium nitrate tetrahydrate and calcium propionate. In one example, the fixer comprises calcium nitrate tetrahydrate and calcium propionate. Surfactant may also be present in the fixer composition. A suitable surfactant may be a non-ionic surfactant, for example, Surfonyl® SEF. The fixer may also include a biocide. A suitable biocide may be Acticide® B20. Water may be present in the fixer in an amount of 5 to 30 weight % of the fixer composition. The fixer may be applied after the substrate has been treated by corona treatment. In some examples, the fixer may be applied to a substrate that has not been corona treated.

Any suitable inkjet ink printing method may be used. Examples include thermal and piezoelectric inkjet printing. In some examples, thermal inkjet printing is employed.

After the inkjet ink composition is printed onto the substrate, it may be dried and cured.

Any suitable source of radiation may be used to cure the inkjet ink and overcoat. In one example, W radiation is employed. Suitable sources of W radiation include UV lamps, LED (light emitting diode) lamps, LEP (light emitting plasma) plasma torches, or lasers operating in the UV range.

The actual wavelength (within the UV range of 280 nm to 400 nm) and intensity of the ultraviolet radiation used may vary, depending at least in part, upon the curable polyurethane in the binder and inkjet ink composition. Examples of suitable UV LED wavelengths include 365 nm, 385 nm, 395 nm or 405 nm, for example, 365 nm and 395 nm.

In some examples, the printed inkjet composition is cured by exposure to electron beam. Electron-beam curing may be carried out in a reduced oxygen atmosphere. For example, the curing step may be carried out in a vacuum or in an inert gas atmosphere, for example, under nitrogen or a noble gas, such as helium or argon.

Suitable electron beam doses range from at least 20 Gy, for example, 20 to 100 Gy, for instance, 30 to 80 Gy. In some examples, electron beam doses of 20, 40 or 60 Gy are employed.

The printing process of the present disclosure can be used to print on a broad selection of substrates, including untreated plastics, flexible as well as rigid, porous or non-porous substrates. Some examples include paper (e.g., plain paper, coated, glossy paper, etc.), cardboard, foam board, textile, and plastics. Examples of suitable plastic substrates include vinyl substrates, for example, vinyl graphic films available from 3M™ under the trademark Scotchcal™ series IJ-40. Other examples include acrylic substrates, for example, acrylic cast graphic films available from 3M™ under the trademark Controltac™ (e.g. 180-10(cast)). Other examples include acrylic glass substrates (PMMA), polypropylene substrates, polystyrene substrates (e.g. high impact polystyrene substrates), PVC substrates and polycarbonate substrates.

FIG. 1 depicts schematically, by way of example only, an example of the sequence of steps that may be taken to perform an example inkjet printing process of the present disclosure. As can be seen from the FIGURE, a fixer 10 may be applied to a print substrate 12. An ink jet ink composition 14 may then be inkjet printed over the fixer. The printed ink layer may be dried by a dryer 16. Thereafter, printed ink jet ink may be cured by electron beam radiation 18.

To further illustrate the present disclosure, examples are described below. It is to be understood that these examples are provided for illustrative purposes and are not to be construed as limiting the scope of the present disclosure.

EXAMPLES

Example 1—Synthesis of Curable PUD 247

33.545 g of g of BGDA (see compound XVII above), 0.335 g of 4-methoxyphenol (MEHQ), 43.585 g of 4,4'-Methylene dicyclohexyl diisocyanate (H12MDI), and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept dry. 3 drops of dibutyl tin dilaurate (DBTDL) was added to initiate the polymerization. Polymerization was continued for 3 hrs at 60° C. 0.5 g samples was withdrawn for % NCO titration to confirm the reaction. The measured NCO value was 10.35%. Theoretical % NCO was 10.55%. 15.939 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.45%. The theoretical % NCO was 2.50%. The polymerization temperature was reduced to 40° C. 6.931 g of taurine, 4.652 g of 50% NaOH, and 34.653 g of deionized water are mixed in a beaker until taurine is completely dissolved. Taurine solution was added to the pre-polymer solution at 40° C. with vigorous stirring over 1-3 mins. The solution became viscous and slight hazy. Stirring was continued for 30 mins at 40° C. The mixture became clear and viscous after 15-20 mins at 40° C. Add cold 197.381 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent). The final PUD dispersion was filtered through fiber glass filter paper. Particle size measured by Malvern Zetasizer is 32.6 nm. Its pH was 7.5. Solid content was 29.08%. This PUD shows a 0.47 unit pH drop after being subjected to an accelerated shelf life (ASL) test. In this ASL test, the PUD is kept at an elevated temperature of 60 degrees C. for 1 week.

Example 2—Synthesis of Curable PUD 251

38.884 g of g of BGDA, 0.389 g of MEHQ, 42.103 g of H12MDI, and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. The measured NCO value was 7.6%. Theoretical % NCO was 8.32%. 12.318 g of HEAA (N-hydroxylethyl acrylamide, CAS #7646-67-5, purchased from Sigma Aldrich), 0.159 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.41%. The theoretical % NCO was 2.41%. The polymerization temperature was reduced to 40° C. 6.695 g of taurine, 4.494 g of 50% NaOH, and 33.474 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 194.649 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern® Zetasizer is 26.8 nm. Its pH was 6.0. Solid content was 30.04%. This PUD shows a 0.13 unit pH drop after 1 week under the ASL test (storage at 60 degrees C. for 1 week).

Example 3—Synthesis of Curable PUD 382

33.732 g of g of BGDA, 0.337 g of MEHQ, 40.176 g of H12MDI, 3.095 g of isophorone diisocyanate (IPDI) and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. The measured NCO value was 10.32%. Theoretical % NCO was 10.63%. 16.028 g of HEAA (N-hydroxylethyl acrylamide, CAS #7646-67-5, purchased from Sigma Aldrich), 0.160 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 50° C. 0.5 g of pre-polymer was withdrawn for final % NCO titration. The measured NCO value was 2.49%. The theoretical % NCO was 2.51%. The polymerization temperature was reduced to 40° C. 6.969 g of taurine, 4.678 g of 50% NaOH, and 34.846 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 197.314 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent if there are a lot of foaming). The final PUD dispersion was filtered through fiber glass filter paper. Particle size measured by Malvern Zetasizer is 25.5 nm. Its pH was 7.4. Solid content was 30.0%. This PUD shows a 0.19 unit pH drop after 1 week under the ASL test (storage at 60 degrees C. for 1 week).

Example 4—Inkjet Ink Composition (with Photoinitiator)

The curable pH stable PUD produced in Example 2 was used to formulate an inkjet ink formulation as follows.

| Component | Weight % |
|---|---|
| Surfactant (Surfonyl ® CT-211, supplied by AirProducts ®) | 0.80 |
| Dynax ® DX-4000 (fluorosurfactant, supplied by Dynax ®) | 0.50 |
| Water soluble photoinitiator (TPA Na) | 0.50 |
| Water soluble sensitizer[2] | 0.25 |
| curable PUD of Example 1 | 10.00 |
| Black (K), cyan (C), yellow (Y), magenta (M) pigment | 2.0-4.0 |
| Water | Balance |

[1]3.0 weight % polyurethane (solids) dispersed in ink composition;
[2]A photosensitizer based on a functionalized anthrone moiety coupled to a polyether chain, see Q above.

Example 5—Inkjet Ink Formulation (No Photoinitiator)

In this example, the curable pH stable PUD produced in Example 2 was used to formulate an inkjet ink formulation as follows.

| Component | Weight % |
|---|---|
| Surfactant (Surfonyl ® CT-211, supplied by AirProducts ®) | 0.80 |
| Dynax ® DX-4000 (fluorosurfactant, supplied by Dynax ®) | 0.50 |
| curable PUD of Example 1 | 10.00 |
| K, C, Y, M pigment | 2.0-4.0 |
| Water | Balance |

[1]3.0 weight % polyurethane (solids) dispersed in ink composition;
[2]A photosensitizer based on a functionalized anthrone moiety coupled to a polyether chain, see Q above.

Example 6

The inkjet ink composition of Example 4 was inkjet printed over a substrate using a thermal inkjet printer. The printed substrates were put into plastic bags either in a glove box containing argon. These substrates were then cured by exposure to electron beam irradiation at various doses. As a comparison, the printed substrates were also cured using UV-LED at 395 nm.

The cured substrates were subjected to a Windex rub test (1 weight (250 g) and graded by visual inspection (0—best, 5 worst). The results are shown in table 1 below. It can be seen that e-beam curing was a more reliable curing method for producing more durable images.

TABLE 1

| Cure Method | Colour | Windex rub test - 0 (best), 5 (worst) |
|---|---|---|
| 20 KGy - e-beam | Black | 0.5 |
| 20 KGy - e-beam | Cyan | 0.5 |
| 20 KGy - e-beam | Magenta | 0.5 |
| 20 KGy - e-beam | Yellow | 0.5 |
| 40 KGy - e-beam | Black | 0 |
| 40 KGy - e-beam | Cyan | 0 |
| 40 KGy - e-beam | Magenta | 0 |
| 40 KGy - e-beam | Yellow | 0 |
| 60 KGy - e-beam | Black | 0 |
| 60 KGy - e-beam | Cyan | 0 |
| 60 KGy - e-beam | Magenta | 0 |
| 60 KGy - e-beam | Yellow | 0 |
| UV-LED | Black | 2.5 |
| UV-LED | Cyan | 0.5 |
| UV-LED | Magenta | 0.5 |
| UV-LED | Yellow | 0 |

Example 7

The inkjet ink composition of Example 5 was inkjet printed over a substrate using a thermal inkjet printer. The printed substrates were put into plastic bags in a glove box containing argon. These substrates were then cured by exposure to electron beam irradiation at various doses. As a comparison, the printed substrates were also cured using UV-LED at 395 nm.

The cured substrates were subjected to a Windex rub test (1 weight (250 g and a 70% IPA rub test (1 weight (250 g), 5 cycles, Crockmeter Cloth). The tested substrates were graded by visual inspection (0—best, 5 worst). The results are shown in table 2 below. It can be seen that e-beam curing was found to be a reliable curing method for producing more durable images. In fact, in the absence of the photoinitiator, UV-LED curing was ineffective.

TABLE 2

| Cure Method | Colour | Windex rub test | 70% IPA rub test |
|---|---|---|---|
| 20 KGy - e-beam | Black | 0 | 3 |
| 20 KGy - e-beam | Cyan | 0 | 2 |
| 20 KGy - e-beam | Magenta | 0 | 3 |
| 20 KGy - e-beam | Yellow | 0 | 1 |
| 40 KGy - e-beam | Black | 0 | 0.5 |
| 40 KGy - e-beam | Cyan | 0 | 0.5 |
| 40 KGy - e-beam | Magenta | 0 | 0.5 |
| 40 KGy - e-beam | Yellow | 0 | 0.5 |
| 60 KGy - e-beam | Black | 0 | 0.5 |
| 60 KGy - e-beam | Cyan | 0 | 0.5 |
| 60 KGy - e-beam | Magenta | 0 | 0.5 |
| 60 KGy - e-beam | Yellow | 0.5 | 0.5 |
| UV-LED | Black | 4 | 5 |
| UV-LED | Cyan | 4 | 5 |
| UV-LED | Magenta | 4 | 5 |
| UV-LED | Yellow | 4.5 | 5 |

Example 8

Example 7 was repeated, except that the e-bema curing was carried out under vacuum by sealing the printed substrates under vacuum in a bag containing an oxygen absorber to remove residual oxygen from the bag. The results are shown in Table 3 below.

TABLE 3

| Cure Method | Colour | Windex rub test | 70% IPA rub test |
|---|---|---|---|
| 20 KGy - e-beam | Black | 0.5 | 3 |
| 20 KGy - e-beam | Cyan | 0 | 3.5 |
| 20 KGy - e-beam | Magenta | 0.5 | 3.5 |
| 20 KGy - e-beam | Yellow | 0 | 0.5 |
| 40 KGy - e-beam | Black | 0 | 0.5 |
| 40 KGy - e-beam | Cyan | 0 | 0.5 |
| 40 KGy - e-beam | Magenta | 0 | 0.5 |
| 40 KGy - e-beam | Yellow | 0 | 0 |
| 60 KGy - e-beam | Black | 0 | 0.5 |
| 60 KGy - e-beam | Cyan | 0 | 0 |
| 60 KGy - e-beam | Magenta | 0 | 0.5 |
| 60 KGy - e-beam | Yellow | 0 | 0.5 |
| UV-LED | Black | 4 | 5 |
| UV-LED | Cyan | 4 | 5 |
| UV-LED | Magenta | 4 | 5 |
| UV-LED | Yellow | 4.5 | 5 |

Example 9 Synthesis of 3-[di-(4-vinylbenzylamino)]propanol (DVBAP)

To a solution of 4-vinylbenzyl chloride (91.6 g, 0.6 mol) and 3-aminopropanol 22.5 g, 0.3 mol) in 300 ml of acetonitrile was added MEHQ (0.5 g) and potassium carbonate (82.9 g, 0.6 mol). The resulting mixture was allowed to reflux in the air for 24 hours. After cooling down to rt, the solid was filtered off and washed with ethyl acetate (2×100 mL). The solvent was removed to give a residue, which was purified by flash chromatography, eluting with hexanes, hexane/ethyl acetate (9/1 to 4/1), giving the desired product 3-[di-(4-vinylbenzylamino)]propanol (DVBAP) (78.4 g, 85%).

Example 10—Synthesis of Curable PUD 279

11.064 g of g of BGDA, 11.415 g of a polycarbonate-based diol (UD50, available from UBE America, Inc.), 0.225 g of MEHQ, 41.906 g of H12MDI, and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. The measured NCO value was 13.02%. Theoretical % NCO was 13.13%. 31.582 g of DVBAP (see Example 9), 0.316 g of MEHQ. and 19 g of acetone were mixed in a beaker and added to the reactor over 30 sec. 9 g of acetone was used to rinse off the residual monomers on the beaker and added to the reactor. The polymerization was continued 3 hours at 60° C. 0.5 g of pre-polymer was withdrawn for final % NCO titration. The measured % NCO value was 3.65%. The theoretical % NCO was 3.73%. The polymerization temperature was reduced to 40° C. 10.001 g of taurine, 6.712 g of 50% NaOH, and 60.003 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 200.856 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 24 nm. Its pH was 7.5. Solid content was 30.05%. This PUD shows 0.27 unit pH drop after 1 week under the ASL test (storage at 60 degrees C. for 1 week).

Example 11—Synthesis of Curable PUD 94

25.801 g of g of BGDA, 0.258 g of MEHQ, 41.906 g of H12MDI, and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. The measured NCO value was 13.18%. Theoretical % NCO was 13.21%. 0.632 g of GDAE (Glycerol 1,3-diallylether, CAS #1708-07-4, purchased from TCI America), 0.206 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. 0.5 g of pre-polymer was withdrawn for final % NCO titration. The measured NCO value was 4.95%. The theoretical % NCO was 4.43%. The polymerization temperature was reduced to 40° C. 11.611 g of taurine, 7.827 g of 50% NaOH, and 58.305 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 162.598 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 16.59 nm. Its pH was 8.5. Solid content was 30.69%. This PUD shows a 0.21 unit pH drop after 1 week under the ASL test (storage at 60 degrees C. for 1 week).

Example 12—Synthesis of Curable PUD 469 by Capping Group-CAPS 22.288 g of g of BGDA, 0.223 g of MEHQ, 36.199 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 26.244 g of a compound of the formula (XIV') above (HPBMA), 0.262 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 15.269 g of 3-(cyclohexylamino)-1-propanesulfonic acid (CAPS), 5.795 g of 50% NaOH, and 38.172 g of deionized water are mixed in a beaker until CAPS is completely dissolved. The CAPS solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 186.374 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 18.98 nm. Its pH was 7.5. Solid content was 28.21%.

Example 13—Synthesis of Curable PUD 470 by Capping Group-CHES 22.506 g of g of BGDA, 0.225 g of MEHQ, 36.553 g of H12MDI and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 26.500 g of HPBMA, 0.265 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 14.441 g of 2-(cyclohexylamino)ethansesulifonic acid (CHES), 5.852 g of 50% NaOH, and 38.102 g of deionized water are mixed in a beaker until CHES is completely dissolved. The CHES solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 187.6144 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 21.93 nm. Its pH was 7.0. Solid content was 27.22%.

Comparative Example 14—Synthesis of Curable PUD 26 by Capping Group—Taurine 23.872 g of g of a compound of the formula XXI above (DA 252), 0.239 g of MEHQ, 38.772 g of H12MDI and 42 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. 28.109 g of HPBMA, 0.281 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. The polymerization temperature was reduced to 40° C. 9.248 g of taurine, 6.207 g of 50% NaOH, and 23.119 g of deionized water are mixed in a beaker until taurine is completely dissolved. The taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 187.6144 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 18.5 nm. Its pH was 8.0. Solid content was 31.25%.

Example 15

The PUDs produced in Examples 12, 13 and Comparative Example 14 above were formulated into an inkjet ink formulation as follows:

| Component | Weight % |
|---|---|
| Surfactant (Surfonyl ® CT-211, supplied by AirProducts ®) | 0.80 |
| Dynax ® DX-4000 (fluorosurfactant, supplied by Dynax ®) | 0.50 |
| Water soluble photoinitiator (TPA Na) | 0.25 |
| Photoinitiator (Irgacure ®2959) | 0.25 |
| Photoinitiator (Irgacure ®819) | 0.20 |
| Water soluble sensitizer[2] | 0.25 |
| curable PUD of Example 12, 13 or Comp. Example 14 | 10.00 |
| Magenta (M) pigment | 4.0 |
| Water | Balance |

[1]3.0 weight % polyurethane (solids) dispersed in ink composition;
[2]A photosensitizer based on a functionalized anthrone moiety coupled to a polyether chain, see Q above.

The inks were printed on to a print substrate and cured under LED. The printed substrates were subject to the following rub tests: a) Eraser—1 Weight (250 g), 10 Cycles; b) Windex—1 Weight (250 g), 5 Cycles, Crockmeter Cloth; c) Water—No Weight (0 g), 1 Cycle, Crockmeter Cloth; d) tape adhesion and e) Sutherland rub test (4 lbs, 200 cycles, Mellotex). The tested substrates were graded by visual inspection. For the Sutherland rub test, a score of 5 was indicative of high durability, while a score of 0 was indicative of poor durability. For the remaining tests, 0 was best and 5, worst. The change in pH measured after a weekunder the ASL test (storage at 60 degrees C. for 1 week). was also determined. The results are shown in Table 4 below.

| Ink contain-ing PUD of Example | Eraser Rub | Windex Rub | Water Rub | Tape Adhesion | Sutherland Rub | Change in pH |
|---|---|---|---|---|---|---|
| 12 | 2.0 | 0.5 | 0 | 0 | 5 | 0.12 |
| 13 | 2.5 | 0.5 | 0 | 0 | 5 | 0.47 |
| 14 (comp) | 2.0 | 1.5 | 0 | 0 | 5 | 1.15 |

Example 16—Synthesis of Curable PUD 142

27.874 g of g of DA 252, 0.279 g of MEHQ, 11.043 g of H12MDI and 20.061 g of HDI, and 30 g of acetone were mixed in a 500 ml of 4-neck round bottom flask. A mechanical stirrer with glass rod and Teflon blade was attached. A condenser was attached. The flask was immersed in a constant temperature bath at 60° C. The system was kept under drying tube. 3 drops of DBTDL was added to initiate the polymerization. Polymerization was continued for 3 hrs at 60° C. 0.5 g samples was withdrawn for % NCO titration to confirm the reaction. The measured NCO value was 14.25%. Theoretical % NCO was 14.99%. 32.506 g of HPBMA, 0.325 g of MEHQ, and 19 g of acetone were mixed in a beaker and added to the reactor over 30 sec. 9 g of acetone was used to rinse off the residual monomers on the beaker and added to the reactor. The polymerization was continued 3 hours at 60° C. 0.5 g of pre-polymer was withdrawn for final % NCO titration. The measured NCO value was 3.00%. The theoretical % NCO was 3.12%. The polymerization temperature was reduced to 40° C. 8.517 g of taurine, 5.716 g of 50% NaOH, and 42.584 g of deionized water are mixed in a beaker until taurine is completely dissolved. Taurine solution was added to the pre-polymer solution at 40° C. with vigorous stirring over 1-3 mins. The solution became viscous and slight hazy. Continue to stir for 30 mins at 40° C. The mixture became clear and viscous after 15-20 mins at 40° C. Add cold 175.154 g of deionized water to polymer mixture in 4-neck round bottom flask over 1-3 mins with good agitation to form PUD dispersion. The agitation was continued for 60 mins at 40° C. The PUD dispersion was filtered through 400 mesh stainless sieve. Acetone was removed with rotorvap at 50° C. (add 2 drops (20 mg) BYK-011 de-foaming agent If there are a lot of foaming). The final PUD dispersion was filtered through fiber glass filter paper. Particle size measured by Malvern Zetasizer is 78 nm. Its pH was 6.5. Solid content was 30.19%. The ink made based on CPUD 142 has around 0.5 unit of pH drop after 1 week under the ASL test (storage at 60 degrees C. for 1 week).

The inks gave very robust durability on a variety of media after curing.

The invention claimed is:
1. An inkjet composition comprising a curable polyurethane dispersion and an aqueous carrier, wherein the curable polyurethane dispersion comprises at least one of:
a polyurethane polymer (a) comprising a first terminal group selected from a styrene-containing group, an allyl-containing group and an acrylamide-containing group, or a polyurethane polymer comprising a first terminal group at one end and a second terminal group at the opposite end, wherein the first terminal group is selected from a styrene-containing group, an allyl-containing group and an acrylamide-containing group, and the second terminal group comprises an ionic group, wherein:
the styrene-containing group is selected from:

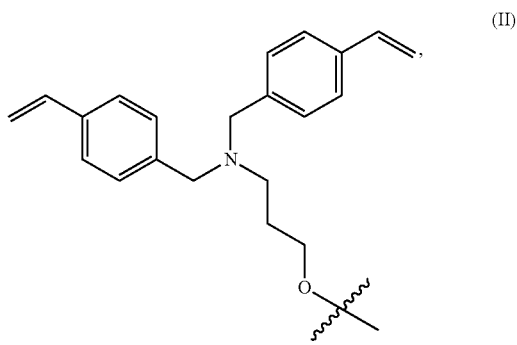

(II)

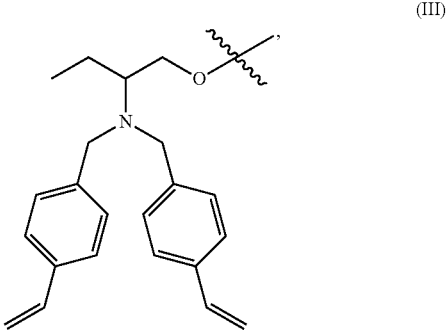

(III)

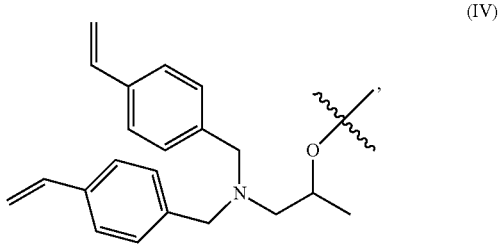

(IV)

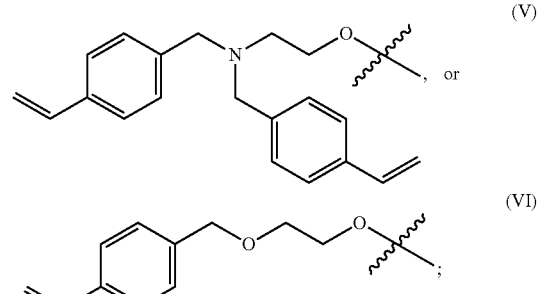

(V)

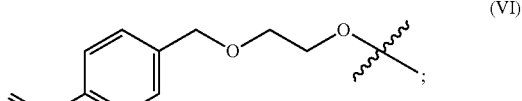

, or

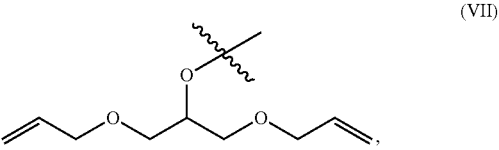

(VI)

the acrylamide-containing group is $CH_2$=$CHC(O)NH(CH_2)_nO$—, wherein n is an integer from 1 to 10; or the allyl-containing group selected from:

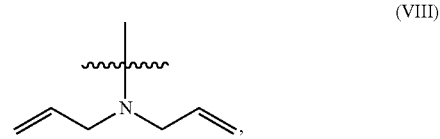

(VII)

(VIII)

-continued

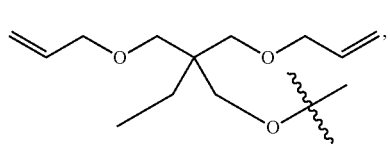
(IX)

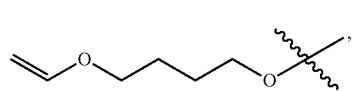
(X)

CH₂=CHCH₂O—— , (XI)

CH₂=CHCH₂NH—— , or (XII)

CH₂=CHOCH₂CH₂CH₂NH—— ; or (XIII)

a polyurethane polymer (c) comprising a polyurethane chain formed by the polymerisation of (i) a blend of at least two different diisocyanates and (ii) a reactive diol having the formula:

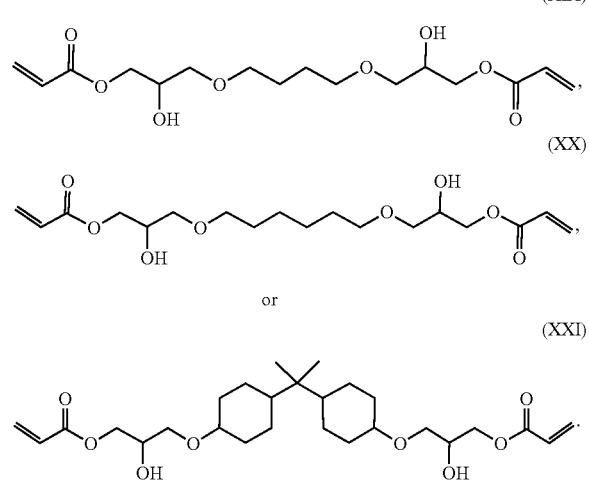
(XIX)
(XX)
or
(XXI)

2. The inkjet composition as claimed in claim 1, wherein the curable polyurethane dispersion comprises the polyurethane polymer (a), and the polyurethane polymer comprises a first terminal group at one end and a second terminal group at the opposite end, wherein the first terminal group is selected from a styrene-containing group, an allyl-containing group and an acrylamide-containing group, and the second terminal group comprises an ionic group.

3. The inkjet composition as claimed in claim 1, wherein the curable polyurethane dispersion comprises the polyurethane polymer (a), and wherein the first terminal group is the acrylamide-containing group.

4. The inkjet composition as claimed in claim 1, wherein the curable polyurethane dispersion comprises the polyurethane polymer (a), and wherein the first terminal group is the styrene-containing group.

5. The inkjet composition as claimed in claim 1, wherein the curable polyurethane dispersion comprises the polyurethane polymer (a), and wherein the first terminal group is the allyl-containing group.

6. The inkjet composition as claimed in claim 1, wherein the second terminal group comprises a sulphonate and/or carboxylate group.

7. The inkjet composition as claimed in claim 1, wherein the curable polyurethane dispersion further comprises a polyurethane polymer (b), and wherein the polyurethane polymer (b) is capped at one end with a terminal group selected from the stabilising groups (A) or (B) having structures:

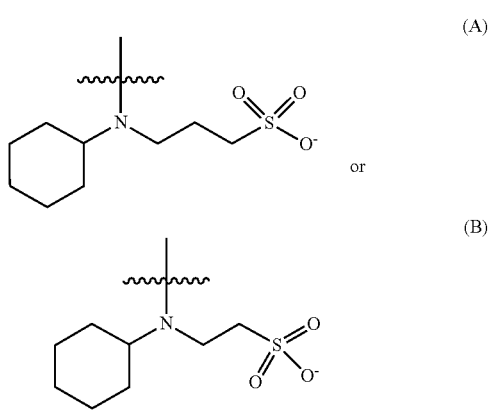
(A)
or
(B)

8. The inkjet composition as claimed in claim 1, wherein the curable polyurethane dispersion comprises the polyurethane polymer (c), wherein the diisocyanates are selected from at least two of methylene diphenyl diisocyanate, hexamethylene diisocyanate, p-tetramethyl xylene diisocyanate, m-tetramethyl xylene diisocyanate, bitolylene diisocyanate, toluene diisocyanate, 4,4'-Methylene dicyclohexyl diisocyanate, p-phenylene diisocyanate, isophorone diisocyanate, 1,5-naphthalene diisocyanate, and trimethylhexamethylene diisocyanate.

9. The inkjet composition as claimed 8, wherein the diisocyanates are a blend of 4,4'-Methylene dicyclohexyl diisocyanate and hexamethylene diisocyanate.

10. The inkjet composition as claimed in claim 1, wherein the curable polyurethane dispersion comprises the polyurethane polymer (c).

11. The inkjet composition as claimed in claim 1, wherein the curable polyurethane dispersion comprises the polyurethane (c), and wherein the polyurethane is capped with a first terminal group selected from an acrylate-containing group, a methacrylate-containing group, a styrene-containing group, allyl-containing group and an acrylamide-containing group, and a second terminal group comprising an ionic group.

12. The inkjet composition as claimed in claim 1, which comprises 0.1 to 10 weight % polyurethane.

13. The inkjet composition as claimed in claim 1, which comprises 0 to less than 0.1 weight % photoinitiator.

14. An inkjet printing method comprising inkjet printing the inkjet composition as claimed in claim 1 onto a print substrate, and curing the a printed inkjet composition formed therefrom on the substrate using electron beam radiation.

15. The inkjet printing method as claimed in claim 14, wherein the printed inkjet composition is cured under vacuum or in the presence of an inert gas.

16. The inkjet composition as claimed in claim 7, wherein at the opposite end, polyurethane polymer (b) is capped with a terminal group selected from an acrylate-containing, allyl-containing, a methacrylate-containing, a styrene-containing group and an acrylamide-containing group.

* * * * *